United States Patent
Mesher et al.

(10) Patent No.: US 10,259,984 B2
(45) Date of Patent: *Apr. 16, 2019

(54) PYROMELLITAMIDE GELLING AGENTS

(71) Applicant: SynOil Fluids Holdings Inc., Calgary (CA)

(72) Inventors: Shaun T. Mesher, Calgary (CA); Olivia Steward, Frome (GB); Daniel Firth, St Andrews (GB); Chris Collett, Calgary (CA)

(73) Assignee: SynOil Fluids Holdings Inc., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,103

(22) Filed: Apr. 18, 2016

(65) Prior Publication Data

US 2016/0312101 A1   Oct. 27, 2016

Related U.S. Application Data

(63) Continuation-in-part of application No. 13/625,822, filed on Sep. 24, 2012, now Pat. No. 9,315,720.

(Continued)

(51) Int. Cl.
*C09K 8/34* (2006.01)
*C09K 8/035* (2006.01)
(Continued)

(52) U.S. Cl.
CPC ............... *C09K 8/34* (2013.01); *C09K 8/035* (2013.01); *C09K 8/64* (2013.01); *C09K 8/82* (2013.01)

(58) Field of Classification Search
CPC . C09K 8/035; C09K 8/34; C09K 8/64; C09K 8/82
See application file for complete search history.

(56) References Cited

U.S. PATENT DOCUMENTS 3,629,109 A   12/1971   Gergel et al.
3,846,310 A   11/1974   Blackwell et al.
(Continued)

FOREIGN PATENT DOCUMENTS

CA   2 790 760 A1   3/2013
EP   0 198 202 A2   10/1986
(Continued)

OTHER PUBLICATIONS

"AC1N5TIQ—Compound Summary (CID 4203179)," PubChem Chemical Database, <http://pubchem.ncbi.nlm.nih.gov/summary/summary.cgi?cid=4203179&loc=ec_rcs> [retrieved Jan. 28, 2013], 4 pages.

(Continued)

*Primary Examiner* — Frances Tischler
(74) *Attorney, Agent, or Firm* — Christensen O'Connor Johnson Kindness, PLLC

(57) ABSTRACT

A downhole fluid comprises a base fluid, for example a hydrocarbon base fluid, and a pyromellitamide gelling agent. The pyromellitamide gelling agent may have the general formula of:

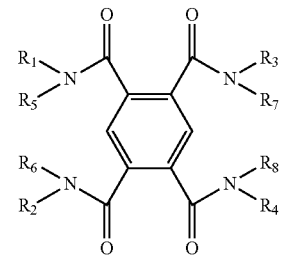

with $R_1$, $R_2$, $R_3$, $R_4$, $R_5$, $R_6$, $R_7$, and $R_8$ each being a hydrogen or an organic group. R1, R2, R3 and R4 may each be hexyl groups or may each be octyl groups. A composition for gelling a downhole fluid, the composition comprising a pyromellitamide gelling agent and a wetting agent.

11 Claims, 37 Drawing Sheets

Related U.S. Application Data

(60) Provisional application No. 61/538,692, filed on Sep. 23, 2011.

(51) Int. Cl.
*C09K 8/64* (2006.01)
*C09K 8/82* (2006.01)

(56) References Cited

U.S. PATENT DOCUMENTS

| | | | |
|---|---|---|---|
| 3,853,774 | A | 12/1974 | Crocker |
| 4,225,446 | A | 9/1980 | Arnold et al. |
| 6,054,417 | A * | 4/2000 | Graham .................. C09K 8/64 166/308.4 |
| 6,372,235 | B1 | 4/2002 | Livoreil et al. |
| 6,645,577 | B2 | 11/2003 | Horikiri |
| 7,186,454 | B2 | 3/2007 | Nagano et al. |
| 7,235,191 | B2 | 6/2007 | Schmidt et al. |
| 7,423,088 | B2 | 9/2008 | Mäder et al. |
| 7,521,400 | B2 | 4/2009 | Samuel |
| 7,790,793 | B2 | 9/2010 | Schmidt et al. |
| 8,034,952 | B2 | 10/2011 | Eddaoudi et al. |
| 2007/0078256 | A1 | 4/2007 | Takaragi et al. |
| 2007/0149663 | A1 | 6/2007 | Schmidt et al. |
| 2011/0101319 | A1 | 5/2011 | Fukumatsu et al. |
| 2011/0105370 | A1 | 5/2011 | Mesher et al. |
| 2011/0200930 | A1 | 8/2011 | Qiu et al. |
| 2011/0230109 | A1 | 9/2011 | Chin et al. |

FOREIGN PATENT DOCUMENTS

| | | |
|---|---|---|
| EP | 0 198 202 B1 | 7/1991 |
| EP | 2 254 127 A1 | 11/2010 |
| JP | 2006-257382 A | 9/2006 |
| WO | 2013/040718 A1 | 3/2013 |

OTHER PUBLICATIONS

"AGN-PC-0JBD62—Compound Summary (CID 71241498)," PubChem Open Chemistry Database [online], <https://pubchem.ncbi.nlm.nih.gov/compound/71241498> [retrieved Oct. 21, 2014].
"AGN-PC-0JBD6L—Compound Summary (CID 71241517)," PubChem Open Chemistry Database [online], <https://pubchem.ncbi.nlm.nih.gov/compound/71241517> [retrieved Oct. 21, 2014].
Almog, J., et al., "Synthesis of 'Capped Porphyrins,'" Tetrahedron 37(21):3589-3601, 1981.
Cheng, R.R., and S.L. Wunder, "NMR and FTIR Investigation of the Solution Imidization Kinetics of Model Compounds of PMDA/ODA Polyamic Ethyl Ester," Journal of Polymer Science: Part B: Polymer Physics 34(3):435-448, Feb. 1996.
"CID 13363507—Compound Summary," PubChem Chemical Database, <http://pubchem.ncbi.nlm.nih.gov/summary/summary.cgi?cid=11363507&loc=ec_rcs> [retrieved Feb. 5, 2013], 3 pages.
"CID 14419369—Compound Summary," PubChem Chemical Database, <http://pubchem.ncbi.nlm.nih.gov/summary/summary.cgi?cid=14419369> [retrieved Jun. 23, 2011], 2 pages.
"CID 59109418—Compound Summary," PubChem Chemical Database, <http://pubchem.ncbi.nlm.nih.gov/summary/summary.cgi?cid=59109418&loc=ec_rcs> [retrieved Jan. 28, 2013], 3 pages.
Compounds found on a search performed on the PubChem Chemical Database [online], at least as early as Jun. 2011, 14 pages.
Dehn, S., et al., "The Structure and Luminescence Properties of Europium (III) Triflate Doped Self-Assembled Pyromellitamide Gels," New Journal of Chemistry 35(7):1466-1471, Jul. 2011.
"Detail of 137707-32-5," LookChem, <http://www.lookchem.com/cas-137/137707-32-5.html> [retrieved Jul. 11, 2011], 2 pages.
Extended European Search Report dated Mar. 24, 2015, issued in corresponding Application No. EP 12 833 565.0, filed Sep. 24, 2012, 7 pages.
"Hydrocarbon Liquid Analysis," SynOil Energy Services, CoreLab Reservoir Analysis, Sep. 20, 2011, p. 2.
International Search Report and Written Opinion dated Jan. 15, 2013, issued in corresponding International Application No. PCT/CA2012/050670, filed Sep. 24, 2012, 8 pages.
International Search Report and Written Opinion dated Dec. 3, 2013, issued in International Application No. PCT/CA2013/050238, filed Mar. 22, 2013, 12 pages.
International Search Report and Written Opinion dated Dec. 4, 2013, issued in International Application No. PCT/CA2013/050729, filed Sep. 24, 2013, 11 pages.
Juwarker, H., and K.-S. Jeong, "Anion-Controlled Foldamers," Chemical Society Reviews 39(10):3664-3674, Oct. 2010.
Munegumi, T., "Where Is the Border Line Between Strong Acids and Weak Acids?" World Journal of Chemical Education 1(1):12-16, 2013.
"P-Toluenesulfonic Acid," Wikipedia, The Free Encyclopedia, <http://en.wikipedia.org/w/index.php?title=PToluenesulfonic_acid&oldid=629840664> [retrieved Oct. 21, 2014].
"Sulfonic Acid," Wikipedia, The Free Encyclopedia, <http://en.wikipedia.org/w/index.php?title=Sulfonic_acid&oldid=611216914> [retrieved Oct. 21, 2014].
"SureCN12245070—Compount Summary (CID 58436287)," PubChem Chemical Database, <http://pubchem.ncbi.nlm.nih.gov/summary/summary.cgi?cid=58436287&loc=ec_rcs> [retrieved Feb. 5, 2013], 3 pages.
"SureCN3071609—Compound Summary (CID 12731559)," PubChem Chemical Database, <http://pubchem.ncbi.nlm.nih.gov/summary/summary.cgi?cid=12731559&loc=ec_rcs> [retrieved Jan. 28, 2013], 3 pages.
"SureCN5080845—Compound Summary (CID 21966950)," PubChem Chemical Database, <http://pubchem.ncbi.nlm.nih.gov/summary/summary.cgi?cid=21966950&loc=ec_rcs> [retrieved Jan. 28, 2013], 3 pages.
"SureCN9164909—Compound Summary (CID 54488810)," PubChem Chemical Database, <http://pubchem.ncbi.nlm.nih.gov/summary/summary.cgi?cid=54488810&loc=ec_rcs> [retrieved Jan. 28, 2013], 3 pages.
Thordarson, P., "From Anion- to Redox-Sensitive Gelators—Improving Our Understanding of Self-Assembled Gels," poster session presented at the Conference of the International Symposium on Macrocyclic & Supramolecular Chemistry, Brighton, U.K., Jul. 3-7, 2011 <http://rsc.conference-services.net/resources/728/2367/pdf/ISMSC2011_0053.pdf>, 1 page.
Tong, K.W.K., et al., "Pyromellitamide Gelators: Exponential Rate of Aggregation, Hierarchical Assembly, and Their Viscoelastic Response to Anions," Langmuir 25(15):8586-8592, Aug. 2009.
Truong, W.T., et al., "Self-Assembled Gels for Biomedical Applications," Chemistry—An Asian Journal 6(1):30-42, Jan. 2011.
Webb, J.E.A., et al., "Pyromellitamide Aggregates and Their Response to Anion Stimuli," Journal of the American Chemical Society 129(22):7155-7162, Jun. 2007.

* cited by examiner

PYROMELLITAMIDE GELLING AGENTS

TECHNICAL FIELD

This document relates to pyromellitamide gelling agents.

BACKGROUND

Pyromellitamide gelling agents have been proposed or used in tissue engineering, drug delivery, LCD displays, and catalysis.

SUMMARY

In an embodiment, there is disclosed a fluid for downhole uses, the fluid comprising a hydrocarbon base fluid, a gelling agent, and an inert solvent to enhance gelling of the gelling agent in the hydrocarbon base fluid for downhole uses, in which the gelling agent is a pyromellitamide gelling agent that comprises an aromatic ring having four amide branches, each of the four amide branches having a carbon to carbon bond with the aromatic ring and each amide branch of the four amide branches has a side chain that is a hydrogen;

in which the gelling agent has the general formula of:

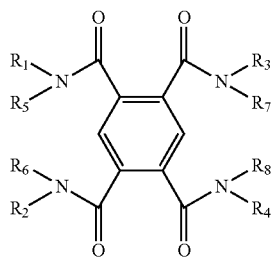

in which each of R5, R6, R7 and R8 are hydrogens, and each of R1, R2, R3, and R4 is an alkyl group; and
in which R1, R2, R3, and R4 are each hexyl groups or R1, R2, R3, and R4 are each octyl groups.

The inert solvent may comprise one or more of water, ethylene glycol, dowanol DPM™, methyl acetate, ethyl acetate, propyl acetate, butyl acetate, octyl acetate, octanol, decanol, acetonitrile, propylnitrile, butylnitrile, ethylacetoacetate, acetone, acetylacetone, acetic anhydride, dimethylformamide, 1-4-dioxane, nitromethane, 2-pentanone, 2-pentandione, methyl, ethyl ketone and diethyl malonate. The inert solvent may be present in a volume ratio between 60:40 and 85:15 in relation to the pyromellitamide gelling agent. The pyromellitamide gelling agent may comprise N,N',N'',N'''-tetrahexylbenzene-1,2,4,5-tetracarboxamide or N,N',N'',N'''-tetraoctylbenzene-1,2,4,5-tetracarboxamide.

The fluid may comprise a breaker, glycol, a suspending agent or wetting agent. A gelling composition may include the solvent and pyromellitamide gelling material in the proportions indicated.

A method of treating a well is also disclosed in which the fluid is applied to the well in a fracturing or drilling operation.

These and other aspects of the device and method are set out in the claims.

BRIEF DESCRIPTION OF THE FIGURES

Embodiments will now be described with reference to the figures, in which like reference characters denote like elements, by way of example, and in which.

TABLE 1

Characteristics of viscosity testing of disclosed gelling agents. Viscosity testing was carried out a Brookfield viscometer. TB, TH, TO and TD refer to N,N',N'',N'''-tetrabutylbenzene-1,2,4,5-tetracarboxamide(TB), N,N',N'',N'''-tetrahexylbenzene-1,2,4,5-tetracarboxamide (TH), N,N',N'',N'''-tetraoctylbenzene-1,2,4,5-tetracarboxamide (TO), and N,N',N'',N'''-tetradecylbenzene-1,2,4,5-tetracarboxamide (TD), respectively.

| FIG. | Gelling Agent | Gelling Agent Concentration (mM) | Solvent | Shear Rate ($sec^{-1}$) | Temperature (° C.) |
|---|---|---|---|---|---|
| 3 | TH | 10 | TG740 | 100 | varying |
| 4 | TO | 10 | TG740 | 100 | varying |
| 5 | TD | 10 | TG740 | 100 | varying |
| 6 | TB | 10 | Cyclohexane | 100 | varying |
| 7 | TB | 7 | Cyclohexane | 100 | varying |
| 8 | TB | 5 | Cyclohexane | 100 | varying |
| 9 | TB | 4 | Cyclohexane | 100 | varying |
| 10 | TB | 3 | Cyclohexane | 100 | varying |
| 11 | TB | 2 | Cyclohexane | 100 | varying |
| 12 | TB | 1 | Cyclohexane | 100 | varying |
| 13 | TH | 7 | TG740 | 100 | varying |
| 14 | TH | 5 | TG740 | 100 | varying |
| 15 | TH | 4 | TG740 | 100 | varying |
| 16 | TH | 3 | TG740 | 100 | varying |
| 17 | TH | 2 | TG740 | 100 | varying |
| 18 | TH | 1 | TG740 | 100 | varying |
| 19 | TO | 7 | TG740 | 100 | varying |
| 20 | TO | 5 | TG740 | 100 | varying |
| 21 | TO | 4 | TG740 | 100 | varying |
| 22 | TO | 3 | TG740 | 100 | varying |
| 23 | TO | 2 | TG740 | 100 | varying |
| 24 | TO | 1 | TG740 | 100 | varying |
| 25 | TD | 7 | TG740 | 100 | varying |
| 26 | TD | 5 | TG740 | 100 | varying |
| 27 | TD | 4 | TG740 | 100 | varying |
| 28 | TD | 3 | TG740 | 100 | varying |
| 29 | TD | 2 | TG740 | 100 | varying |
| 30 | TD | 1 | TG740 | 100 | varying |
| 31 | TH:TO | 2:2 | TG740 | 100 | varying |
| 32 | TH:TO | 2:2 | TG740 | 100 | varying |
| 33 | TO:TD | 2:2 | TG740 | 100 | varying |
| 34 | TO:TD | 2:2 | TG740 | 100 | varying |
| 35 | TH:TD | 2:2 | TG740 | 100 | varying |
| 36 | TB | 7 | Cyclohexane | 100 | 25 |
| 37 | TB | 7 | Cyclohexane | 400 | 25 |
| 38 | TB | 7 | Cyclohexane | 500 | 25 |
| 39 | TB | 7 | Cyclohexane | varying | 25 |

Figure 3:
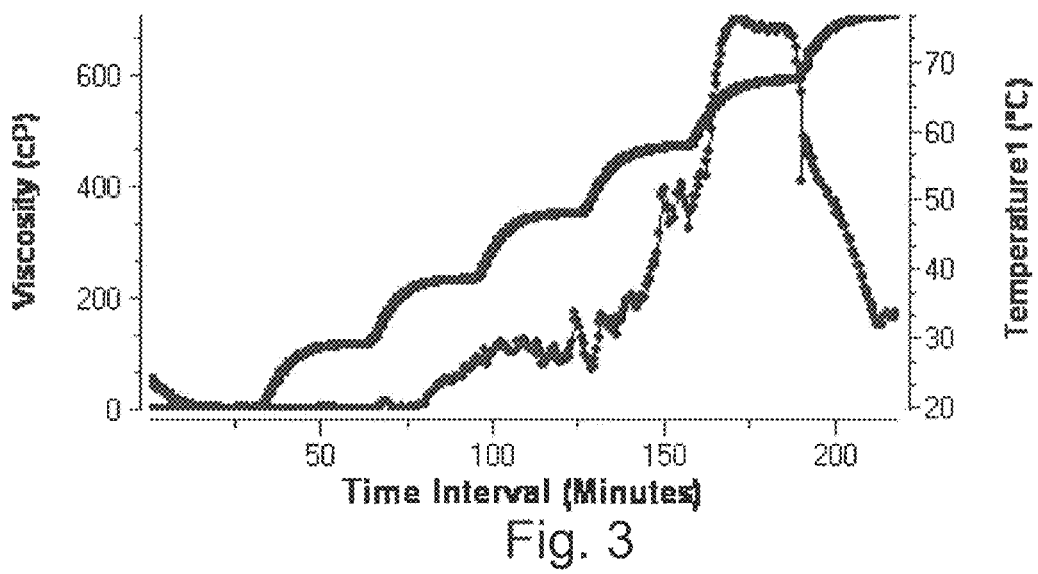
Figure 4:
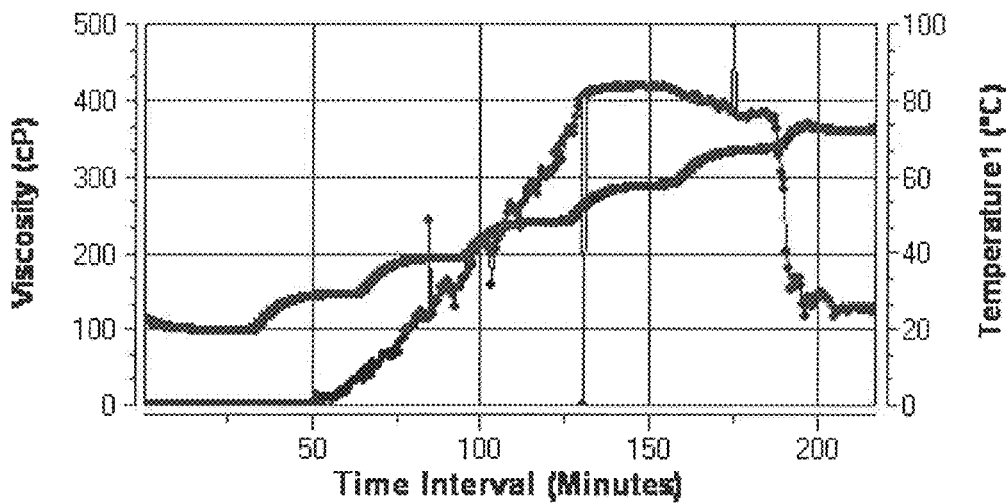
Figure 5:
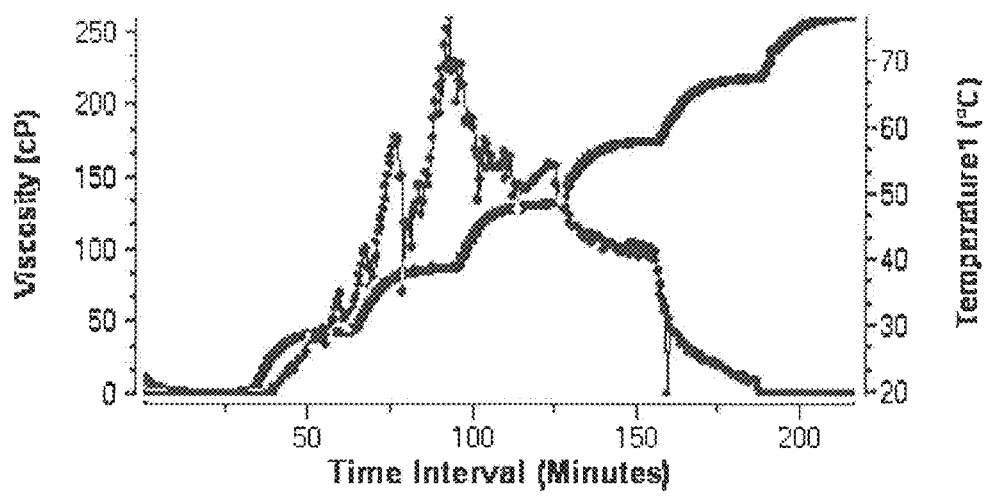
Figure 6:
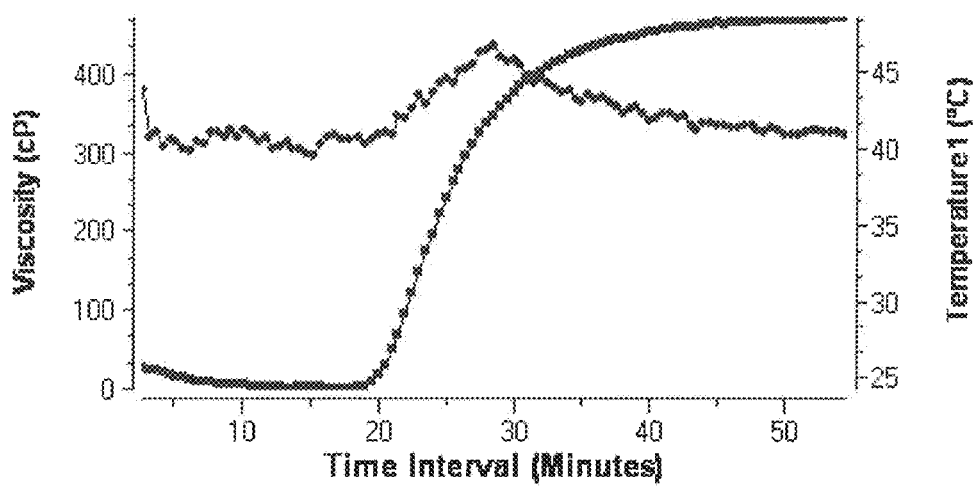
Figure 7:
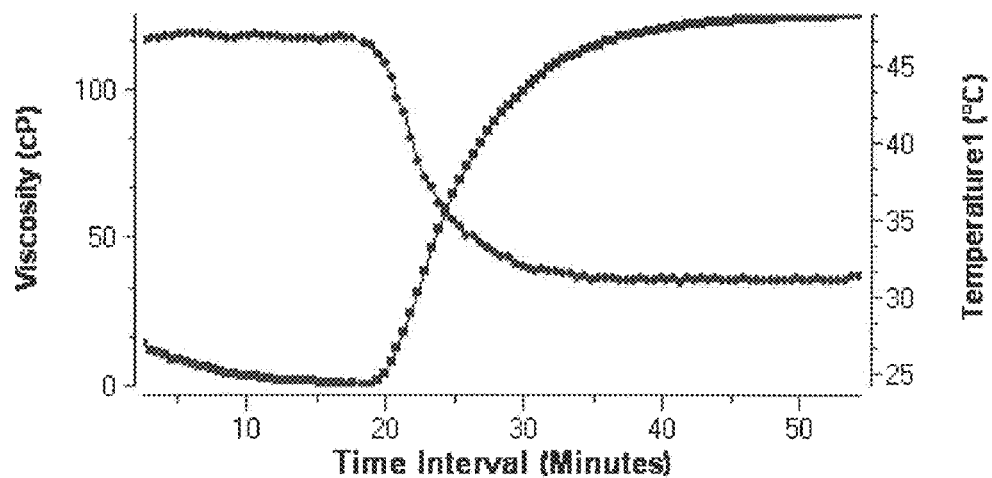
Figure 8:
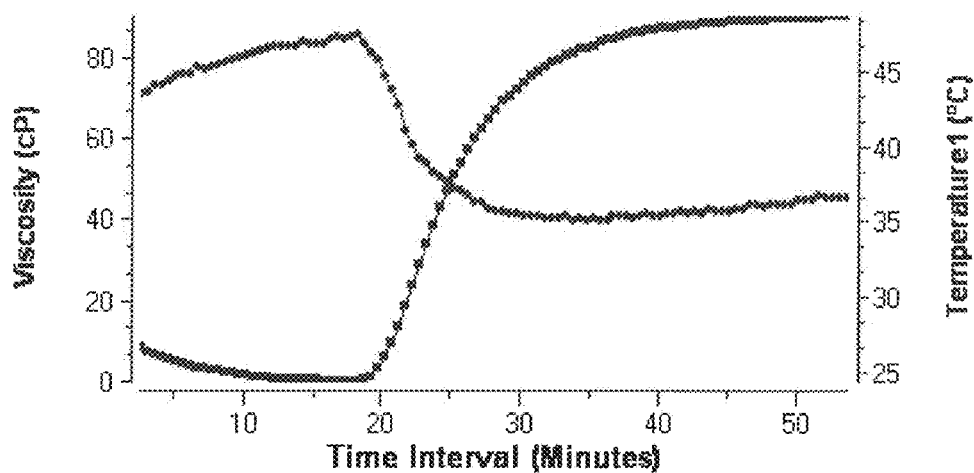
Figure 9:
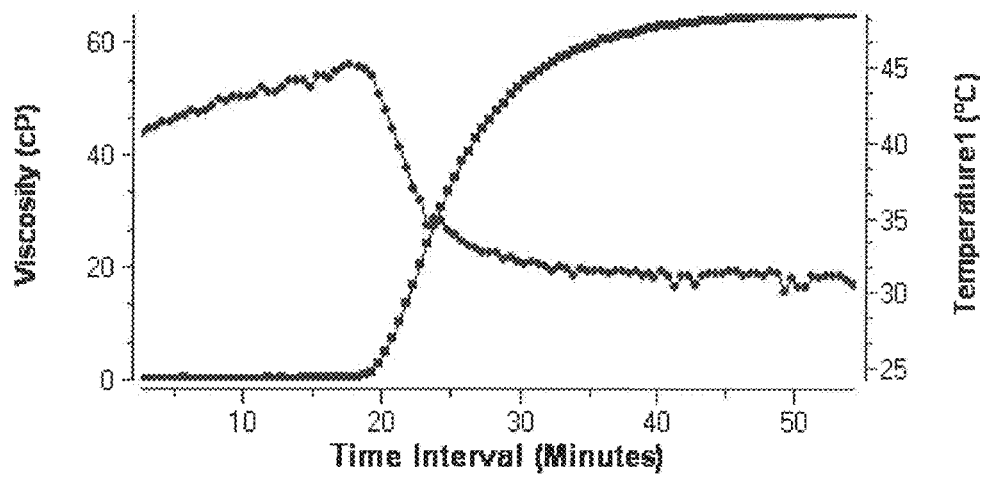
Figure 10:
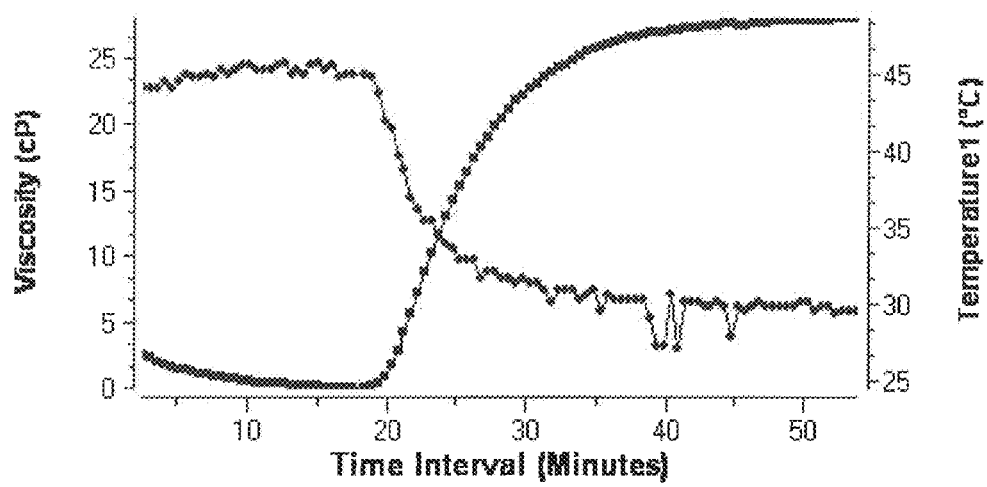
Figure 11:
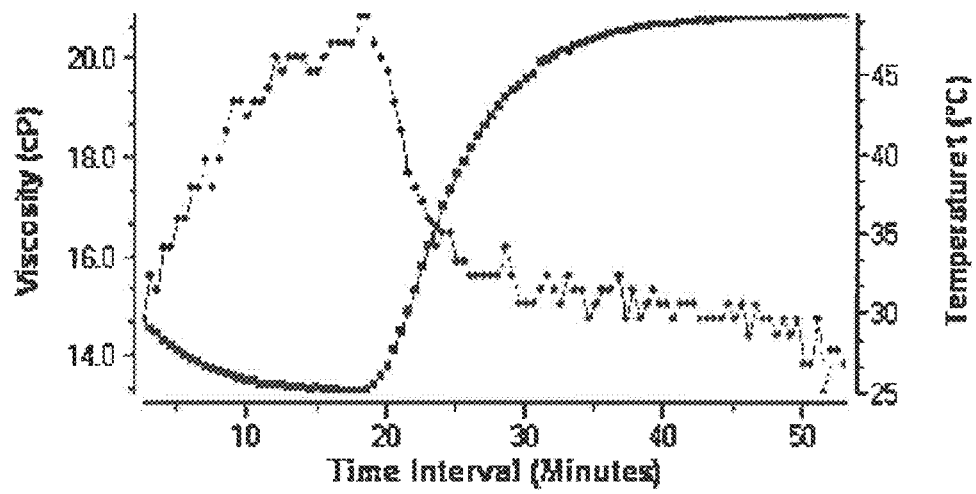
Figure 12:
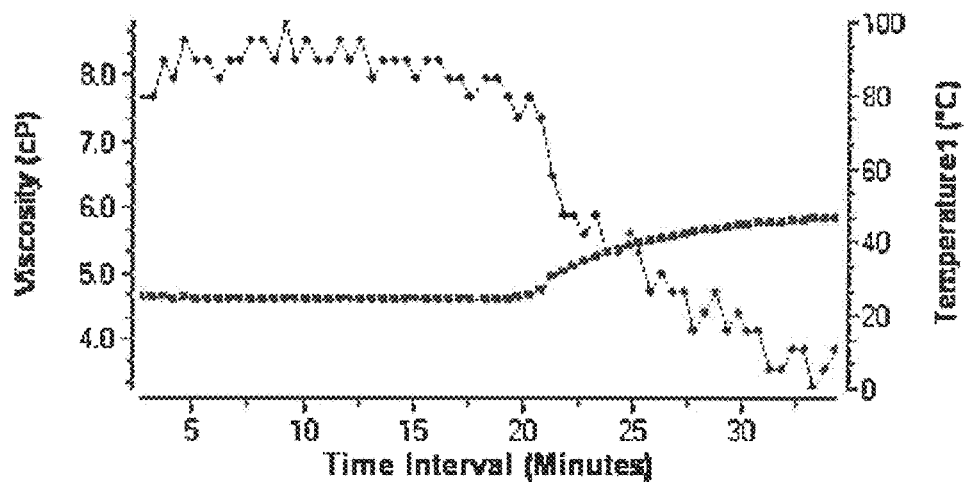
Figure 13:
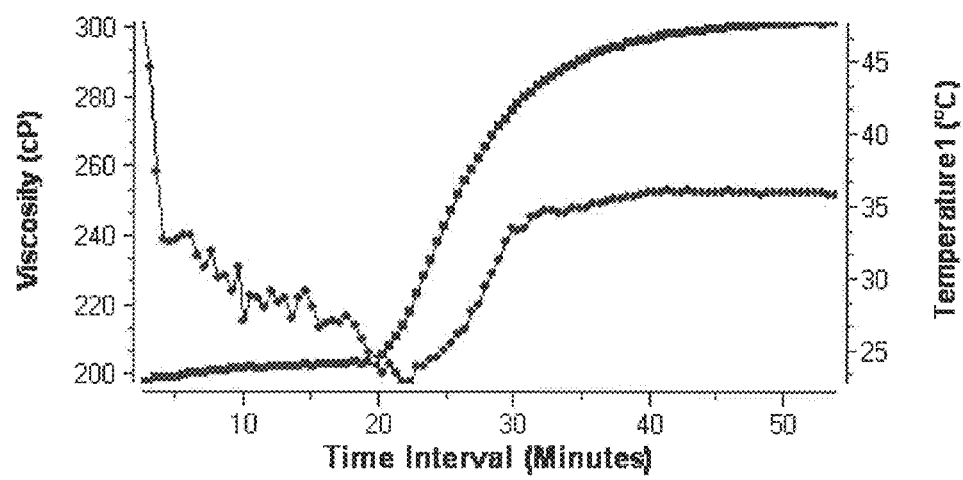
Figure 14:
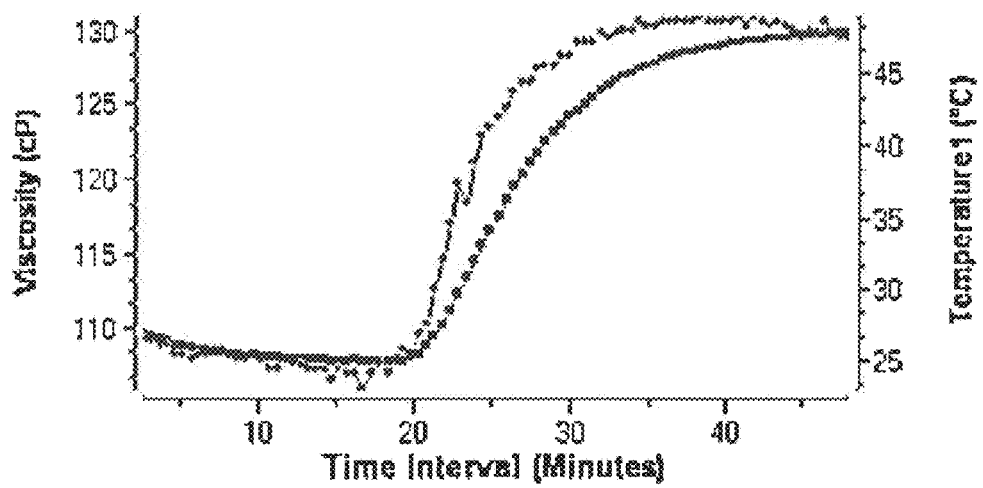
Figure 15:
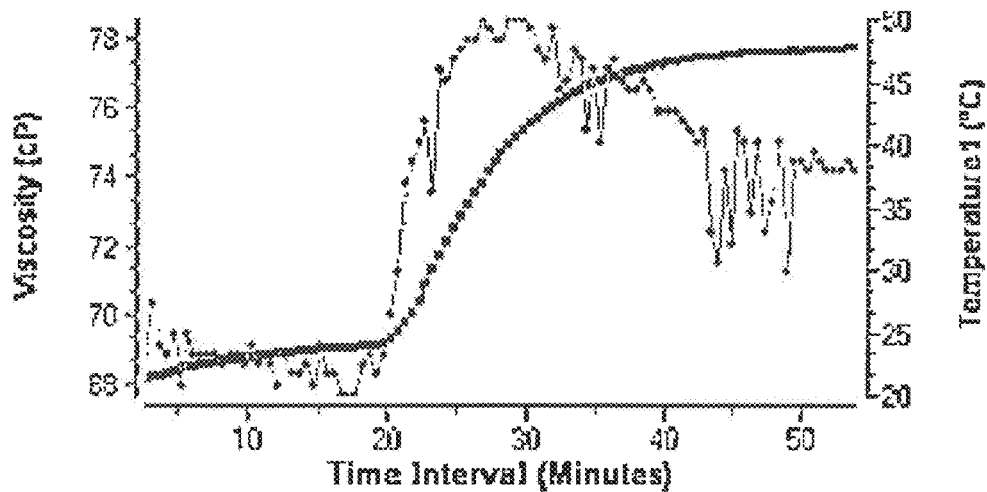
Figure 16:
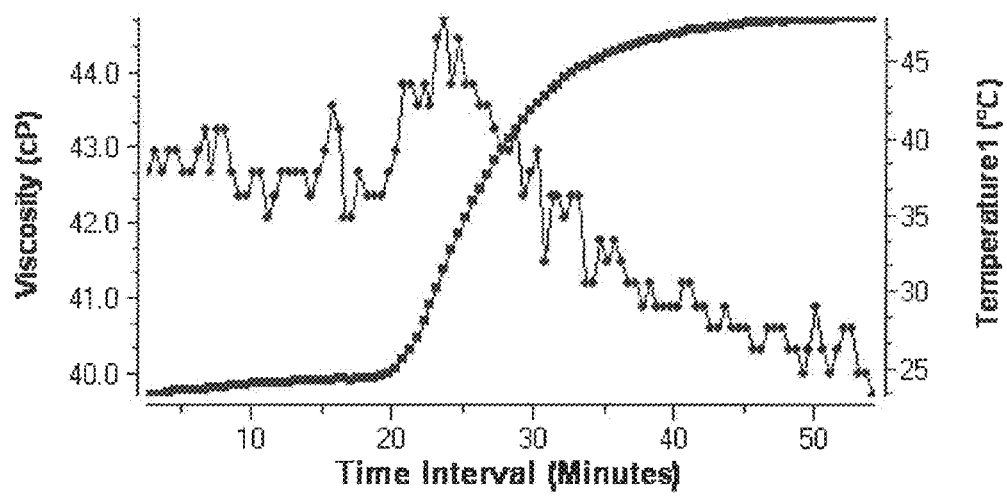
Figure 17:
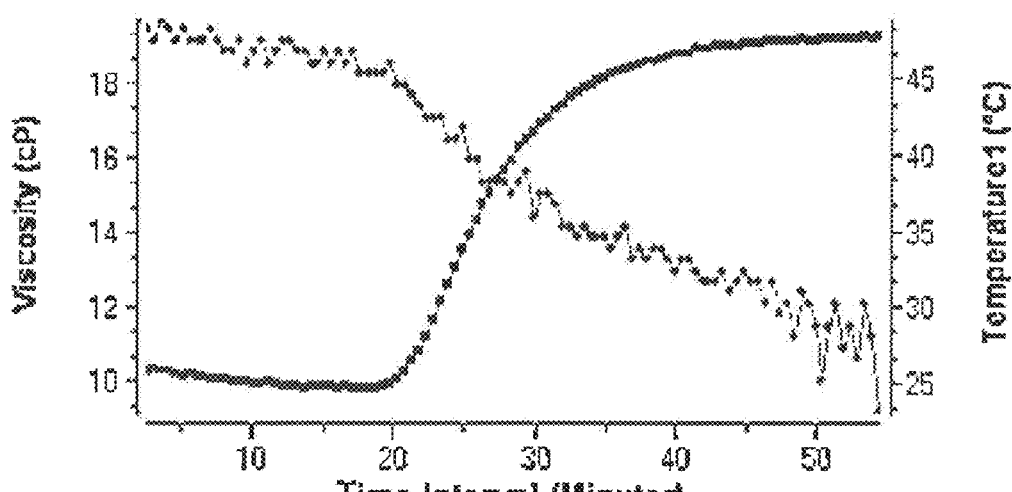
Figure 18:
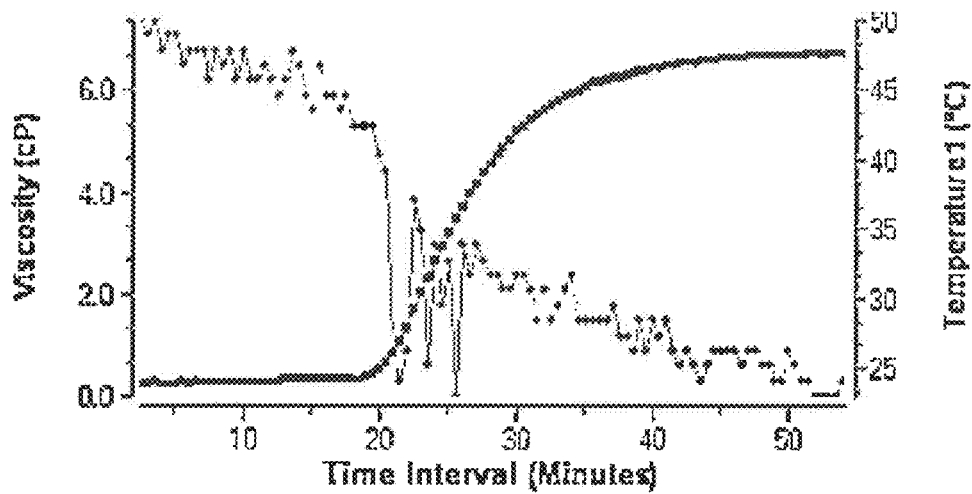
Figure 19:
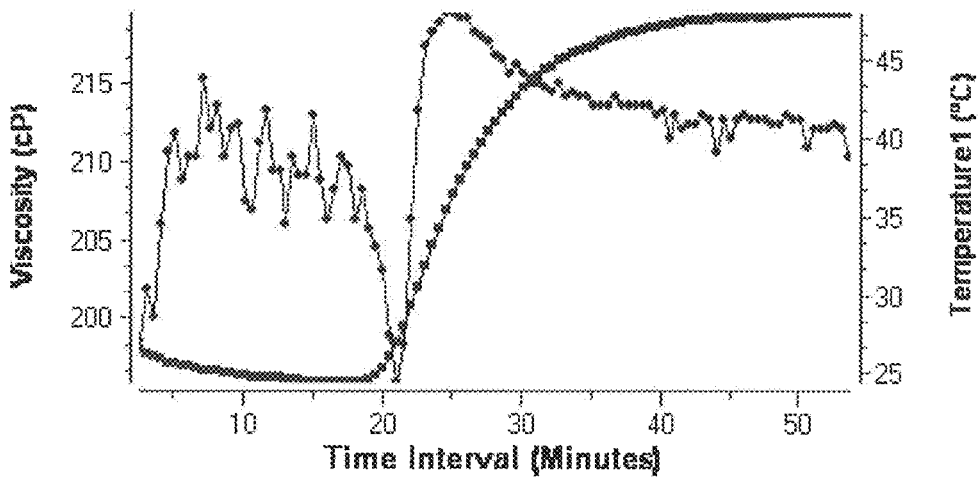
Figure 20:
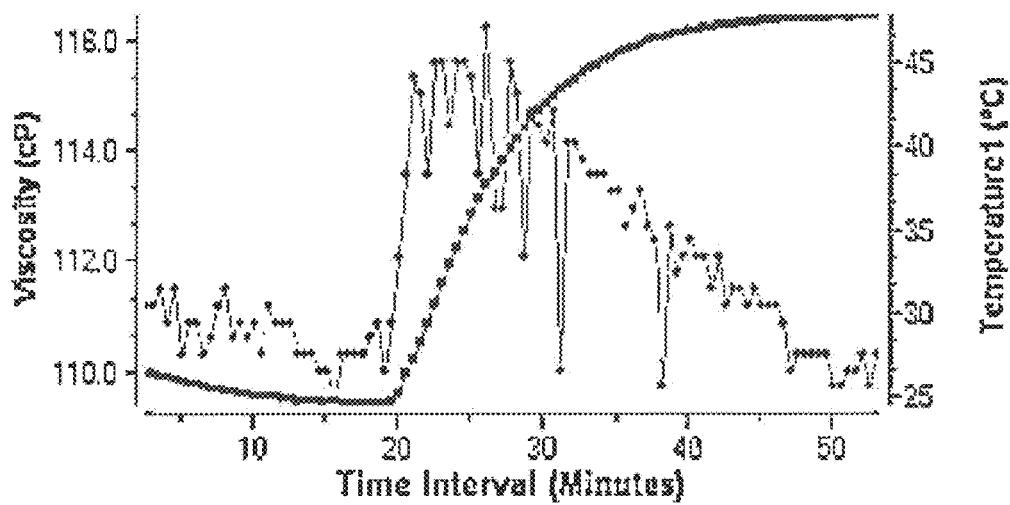
Figure 21:
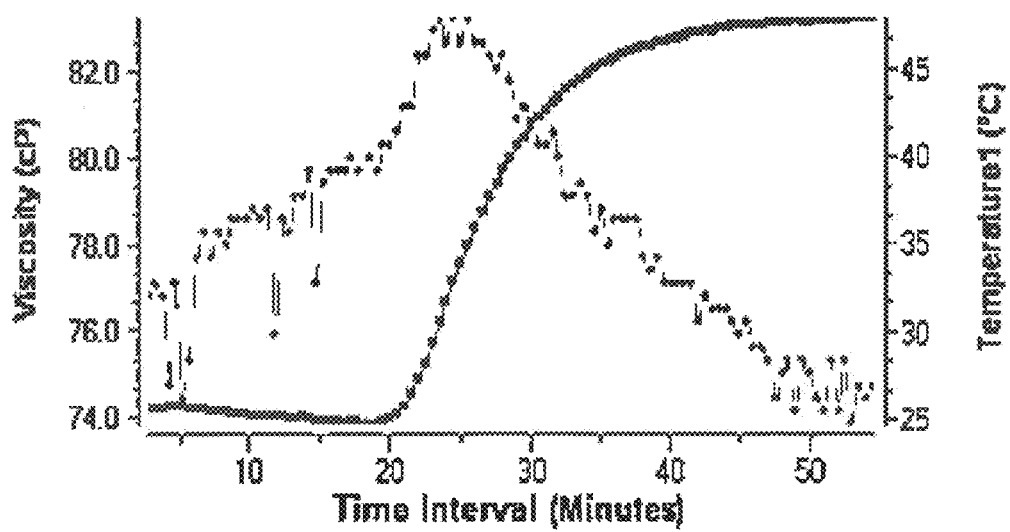
Figure 22:
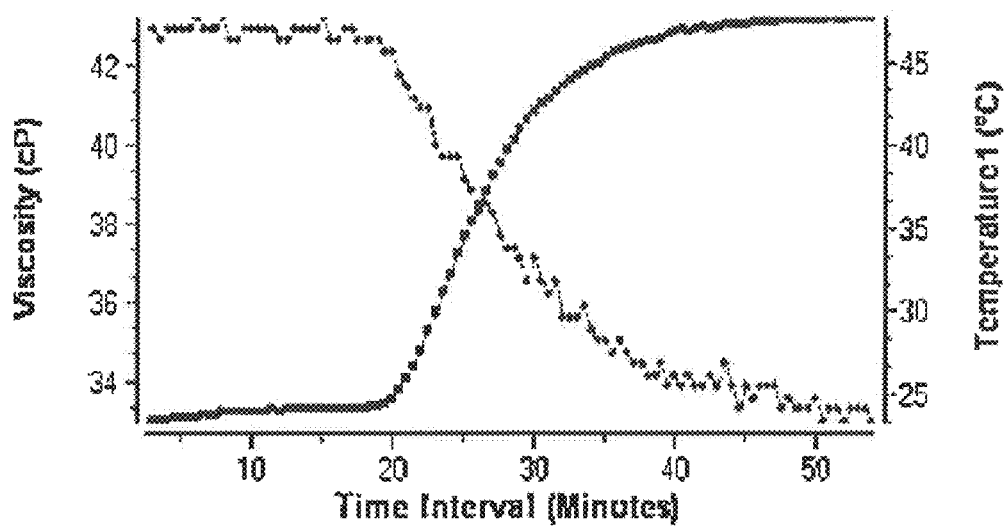
Figure 23:
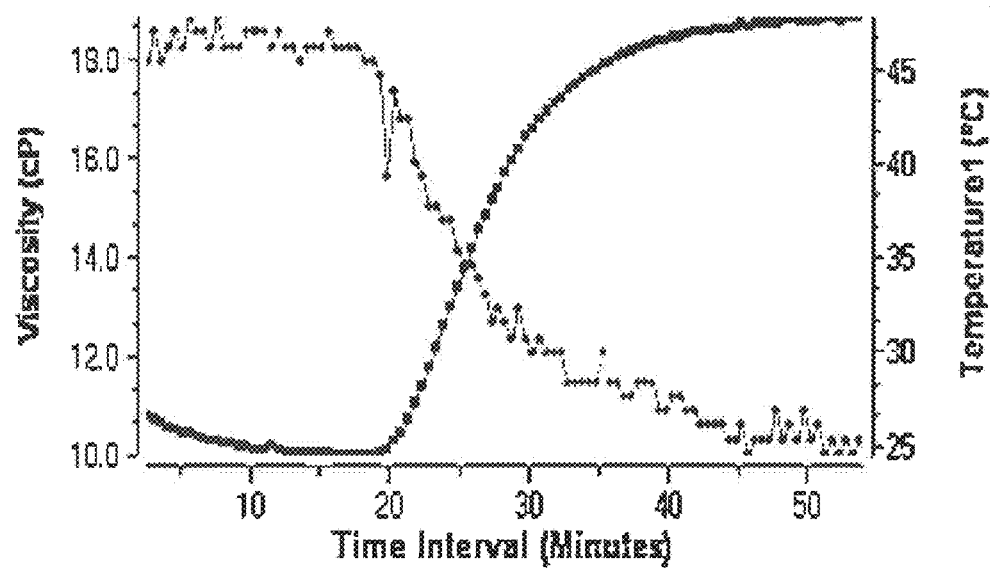
Figure 24:
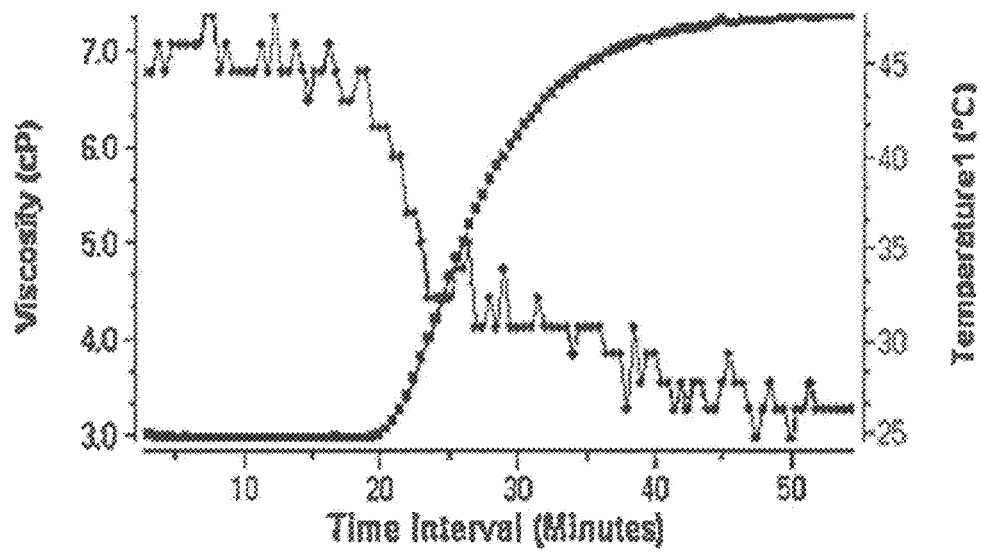
Figure 25:
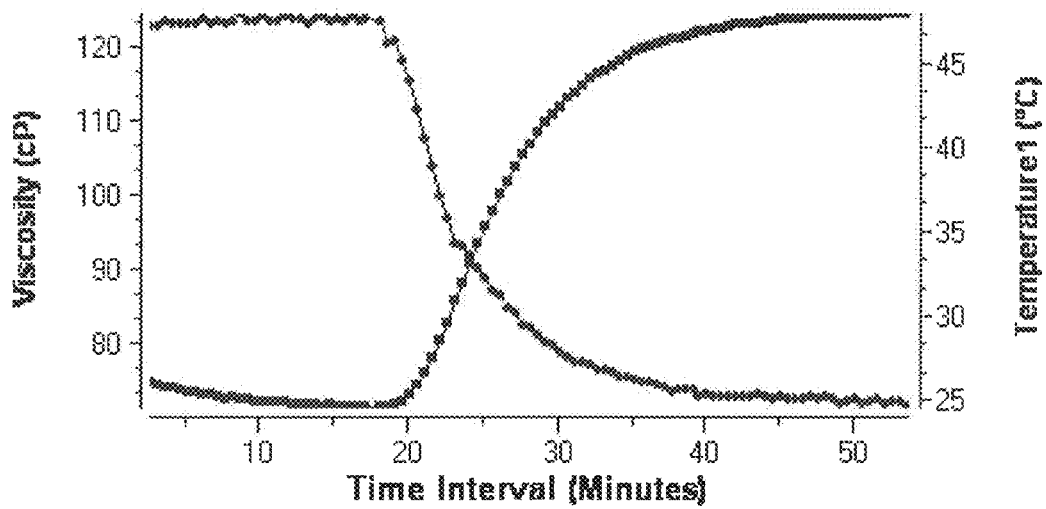
Figure 26:
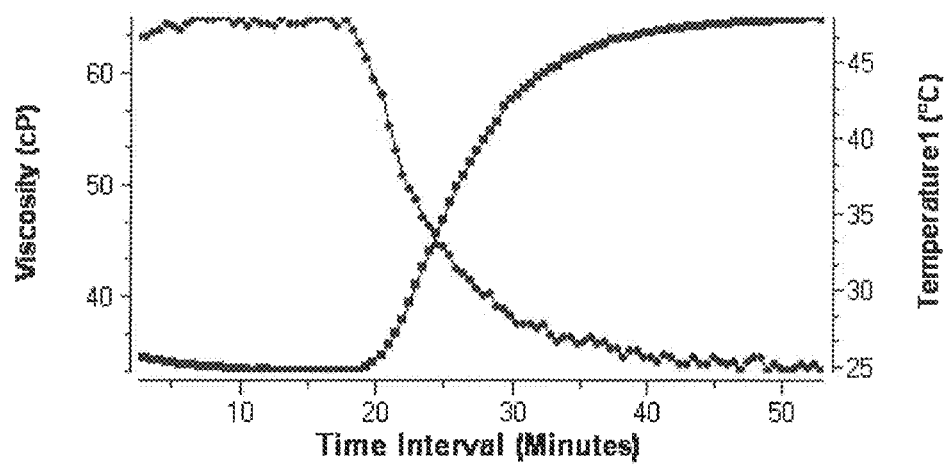
Figure 27:
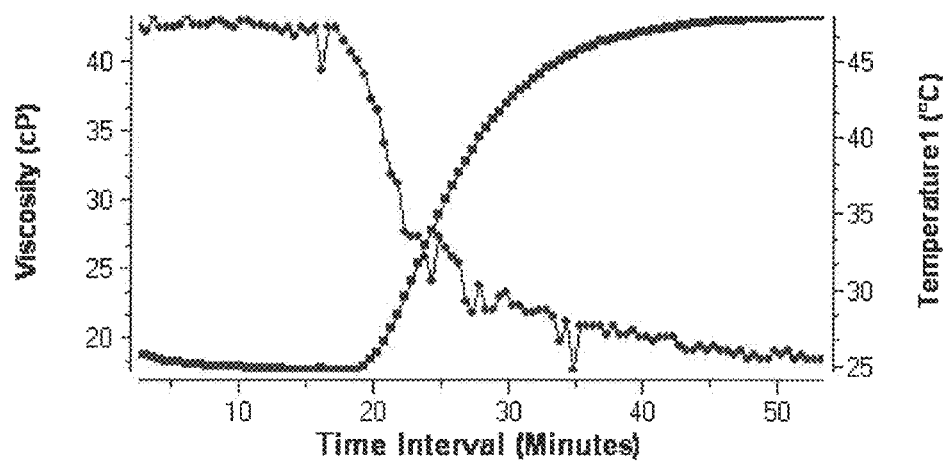
Figure 28:
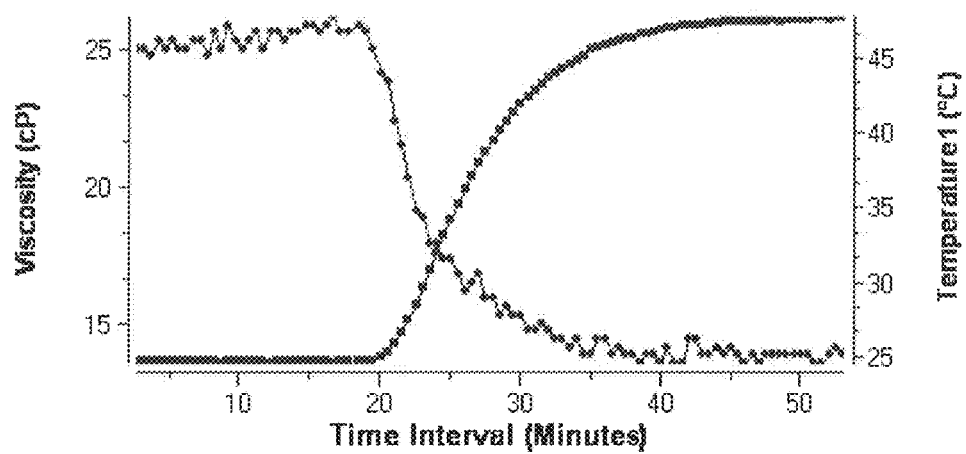
Figure 29:
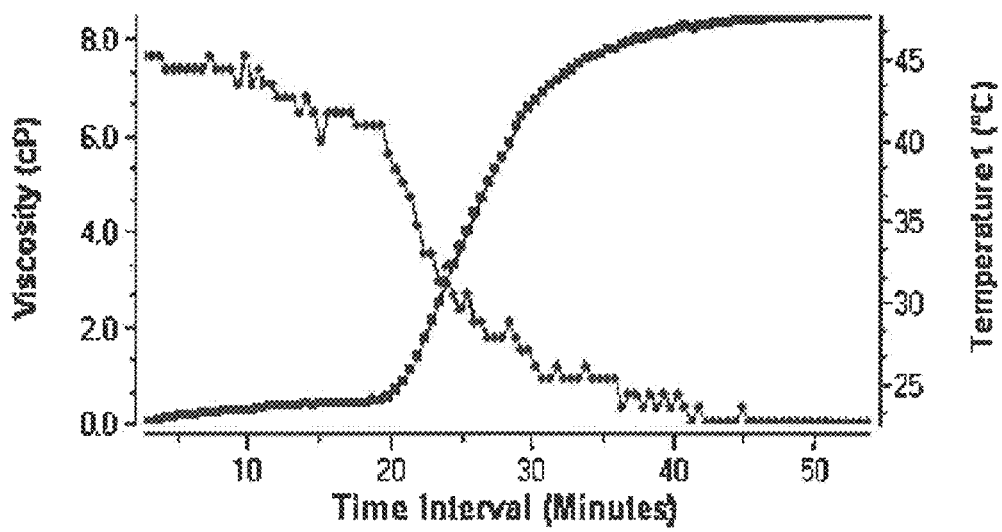
Figure 30:
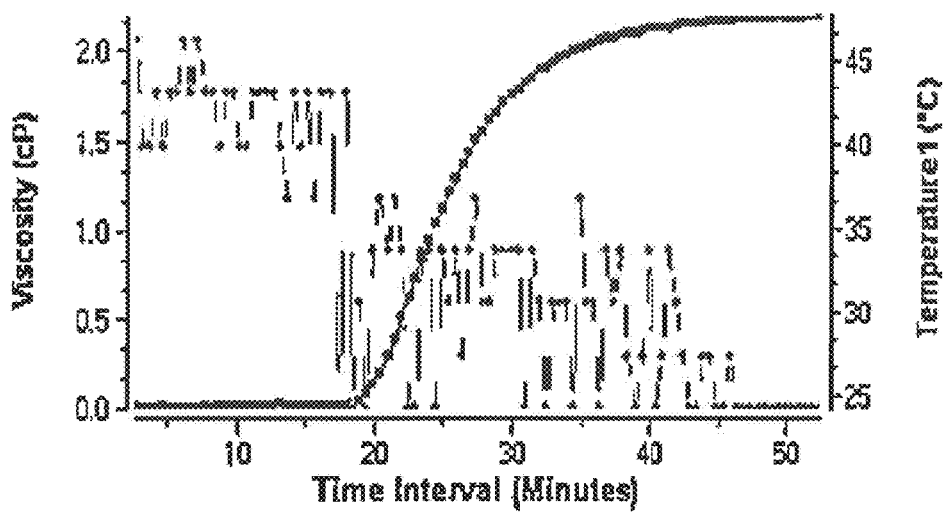
Figure 31:
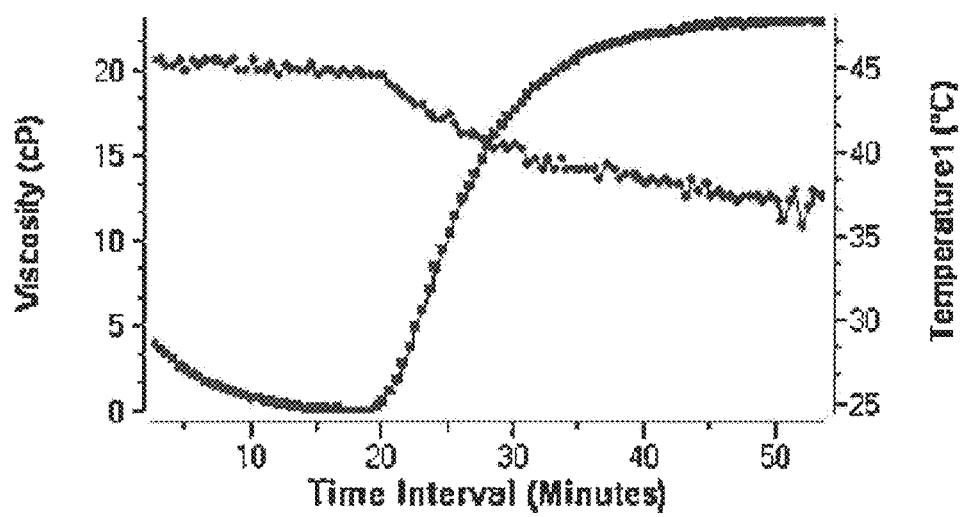
Figure 32:
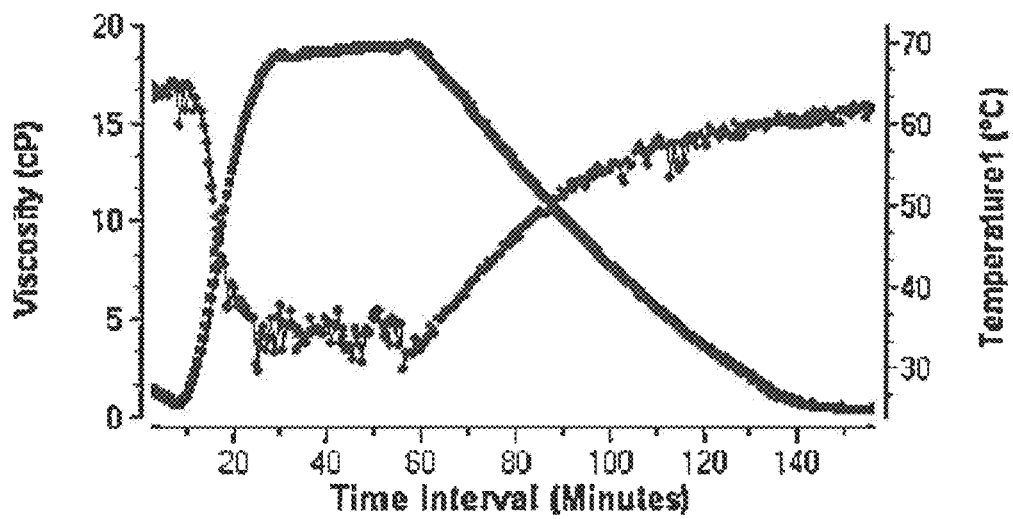
Figure 33:
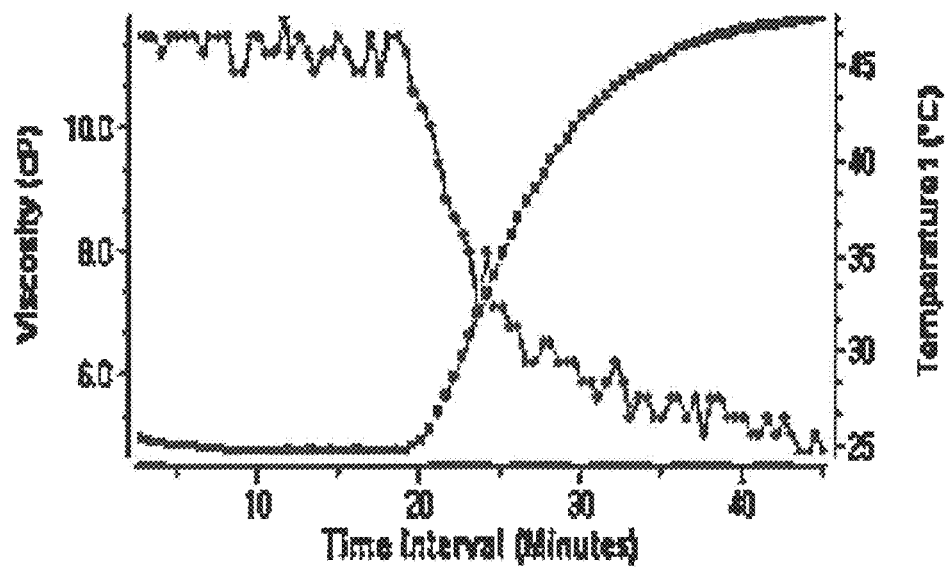
Figure 34:
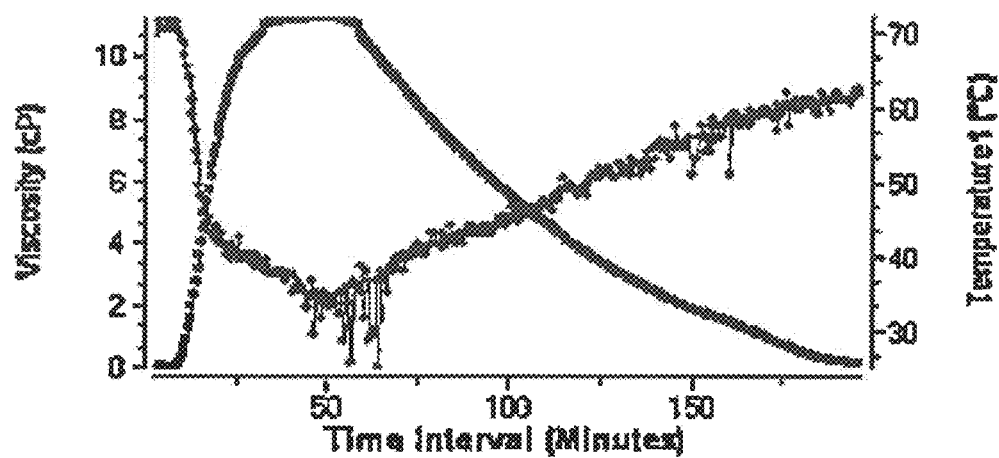
Figure 35:
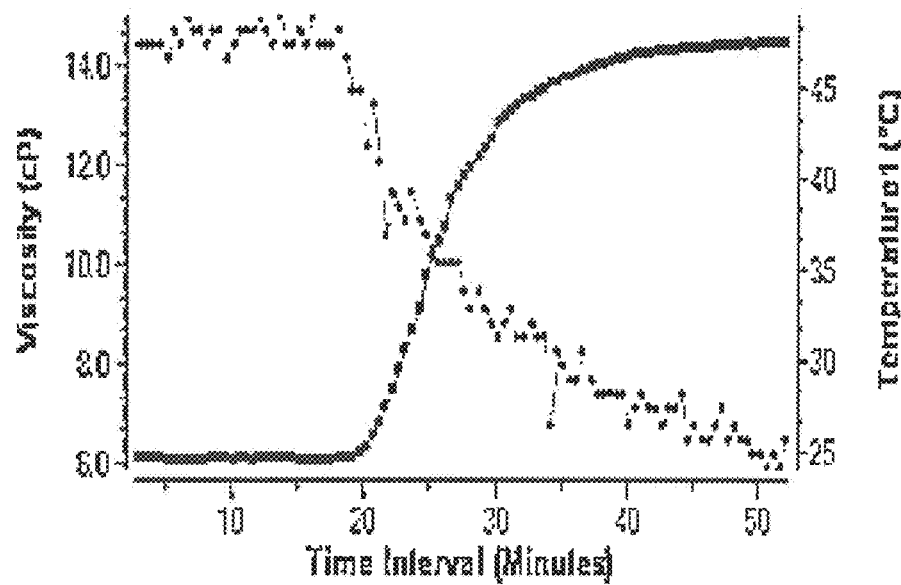
Figure 36:
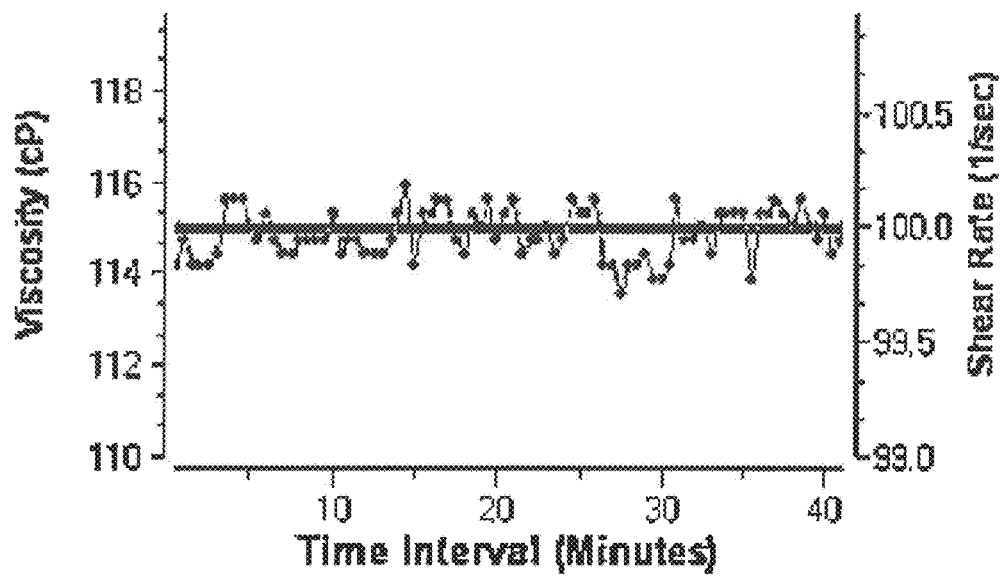
Figure 37:
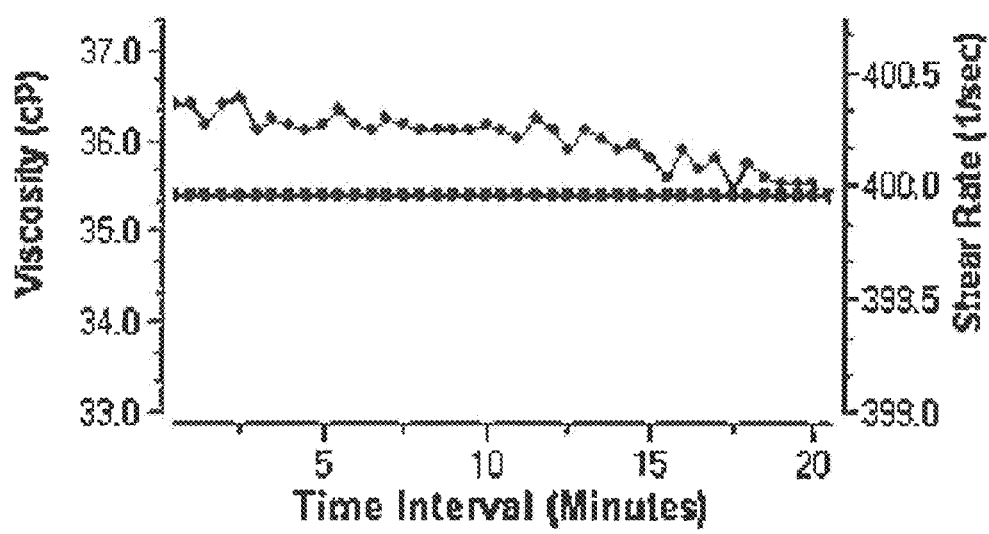
Figure 38:
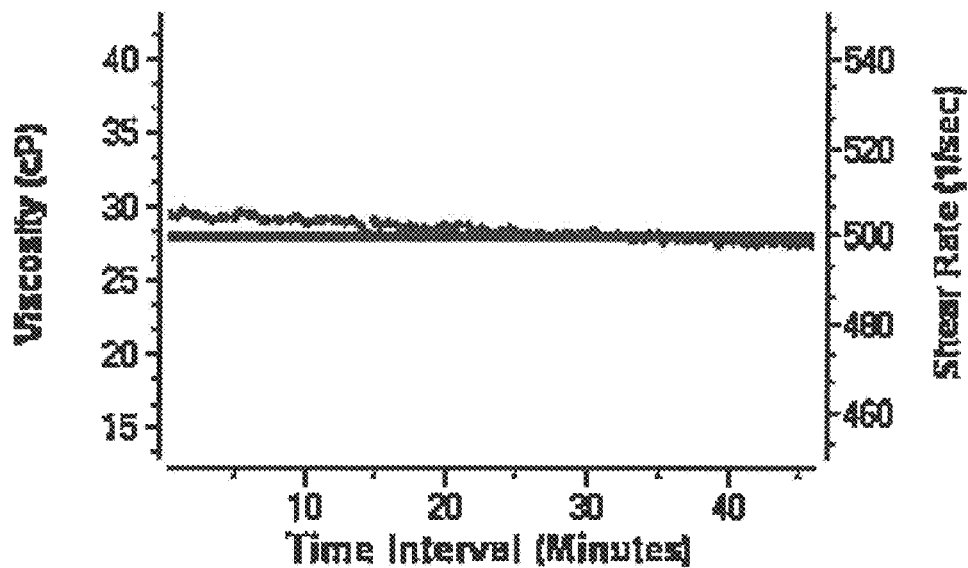
Figure 39:
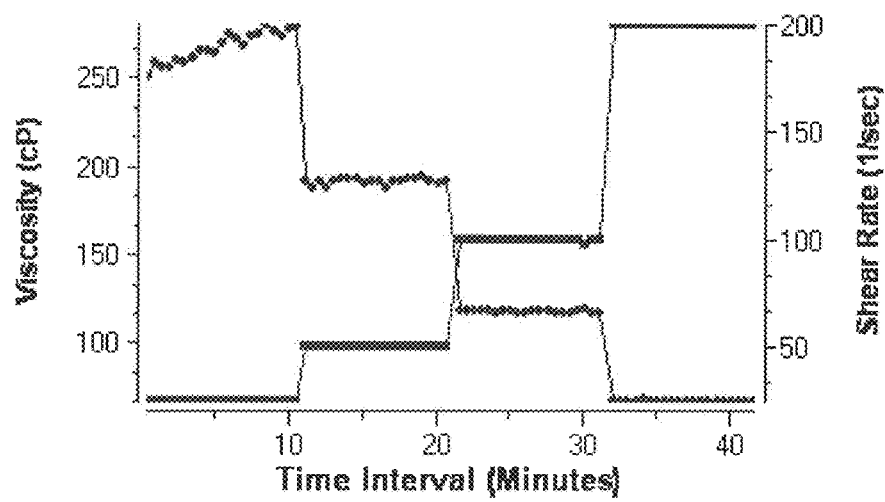
Figure 40:
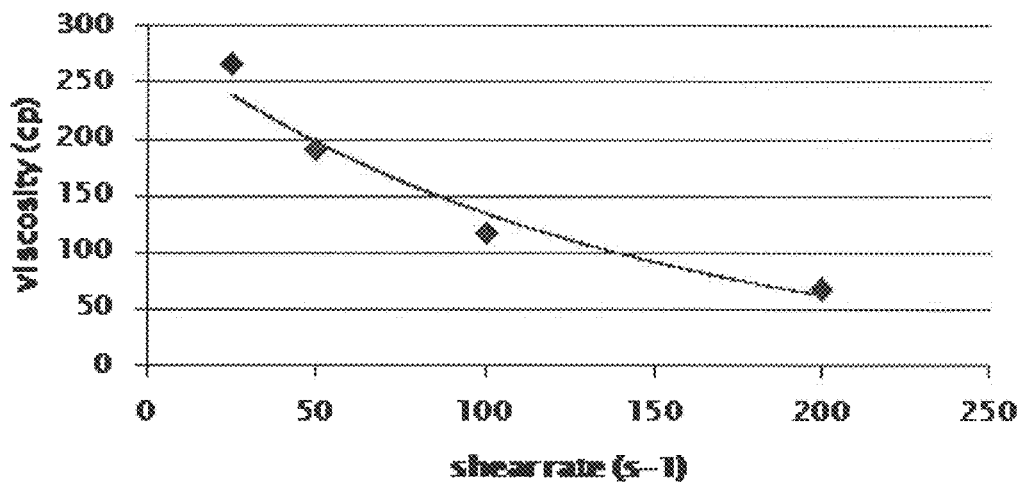
Figure 41:
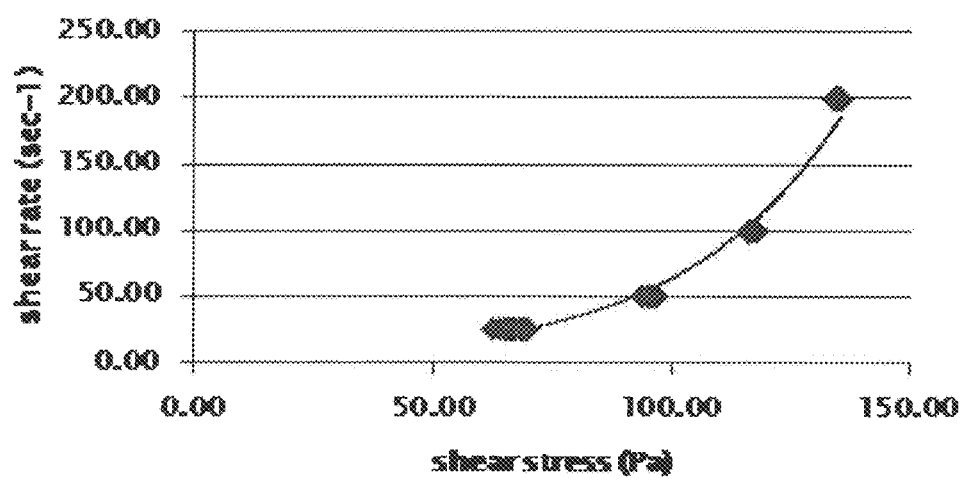
Figure 42:
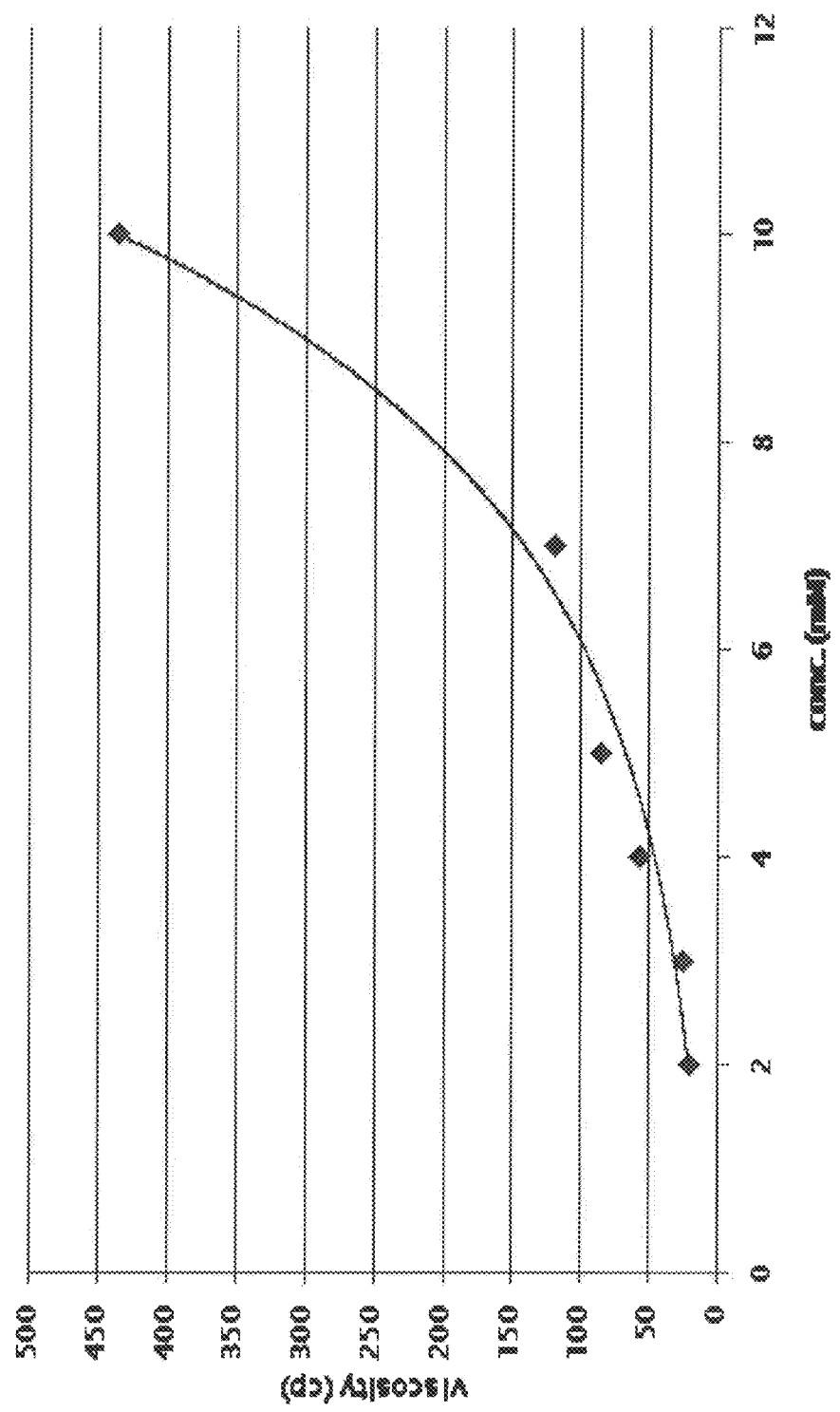
Figure 43:
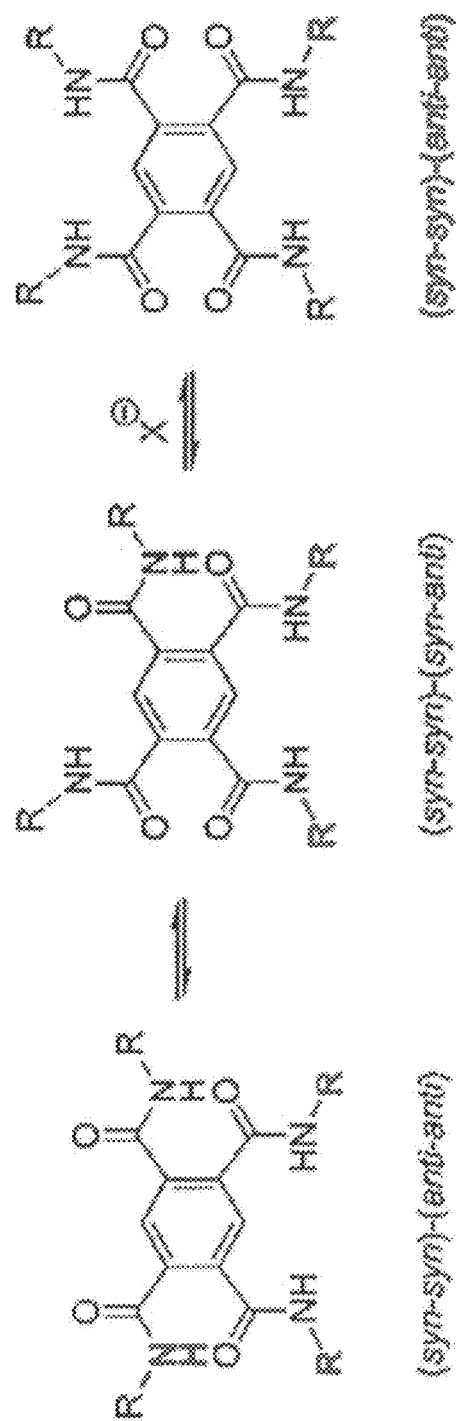
Figure 44:
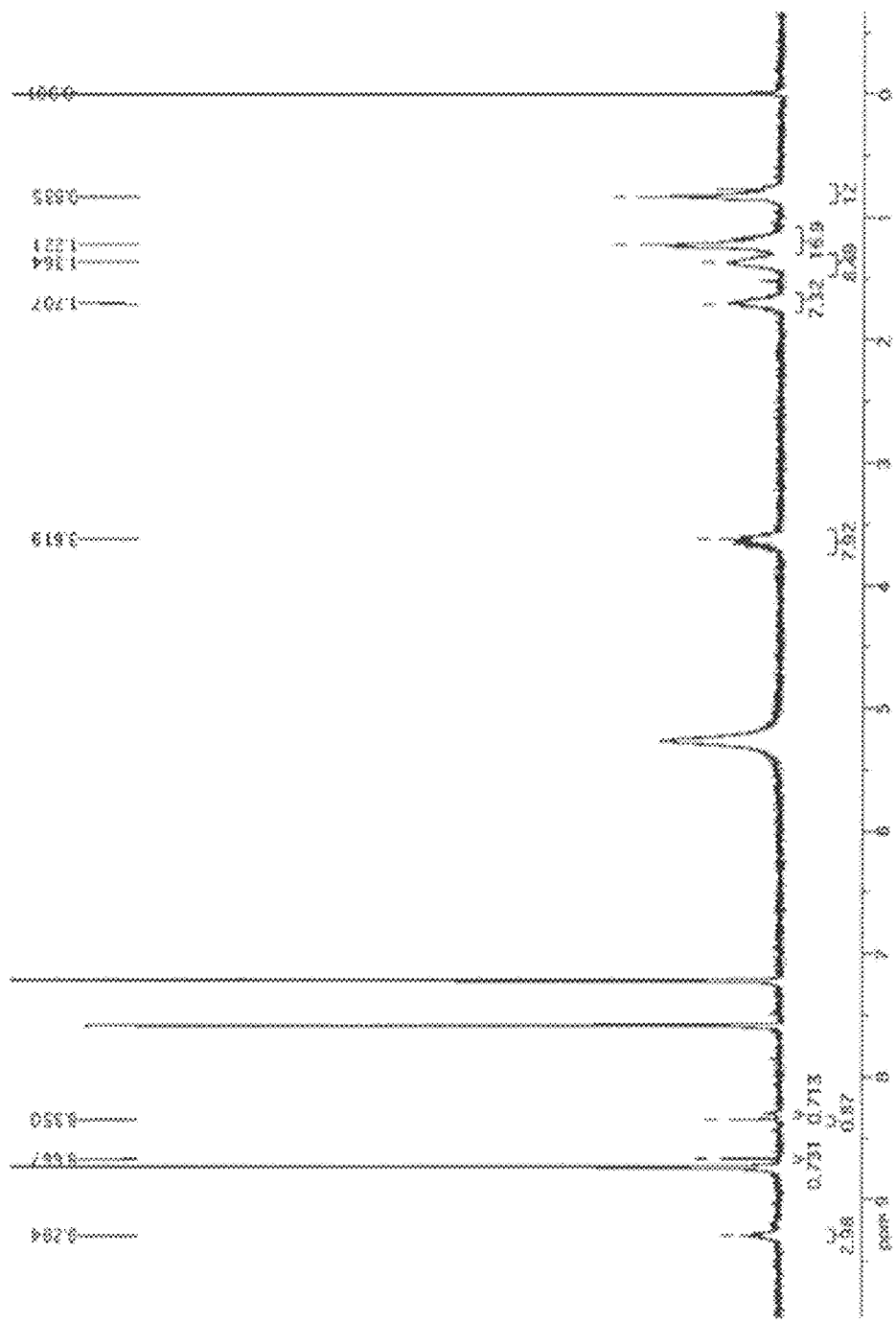
Figure 45:
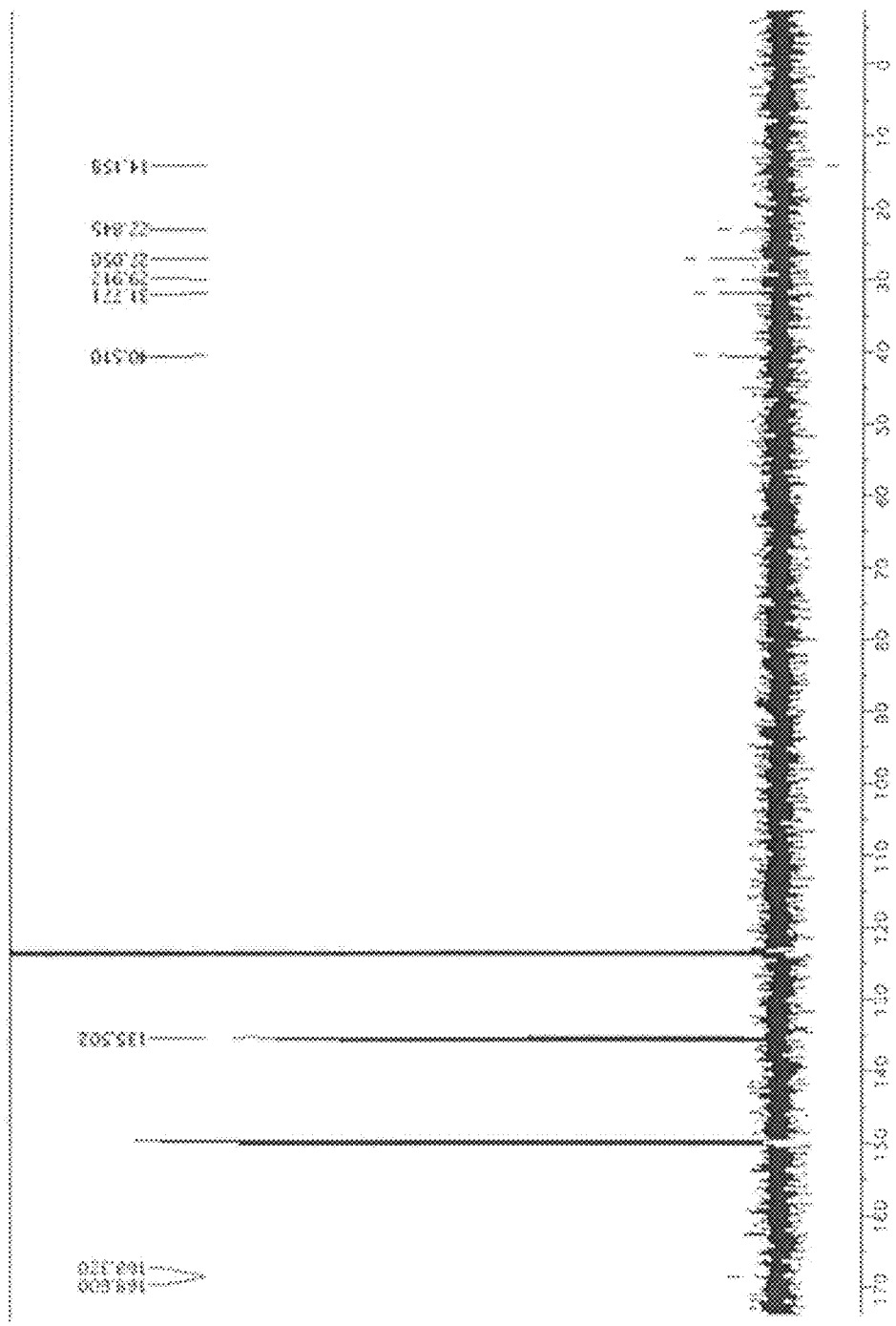
Figure 46:
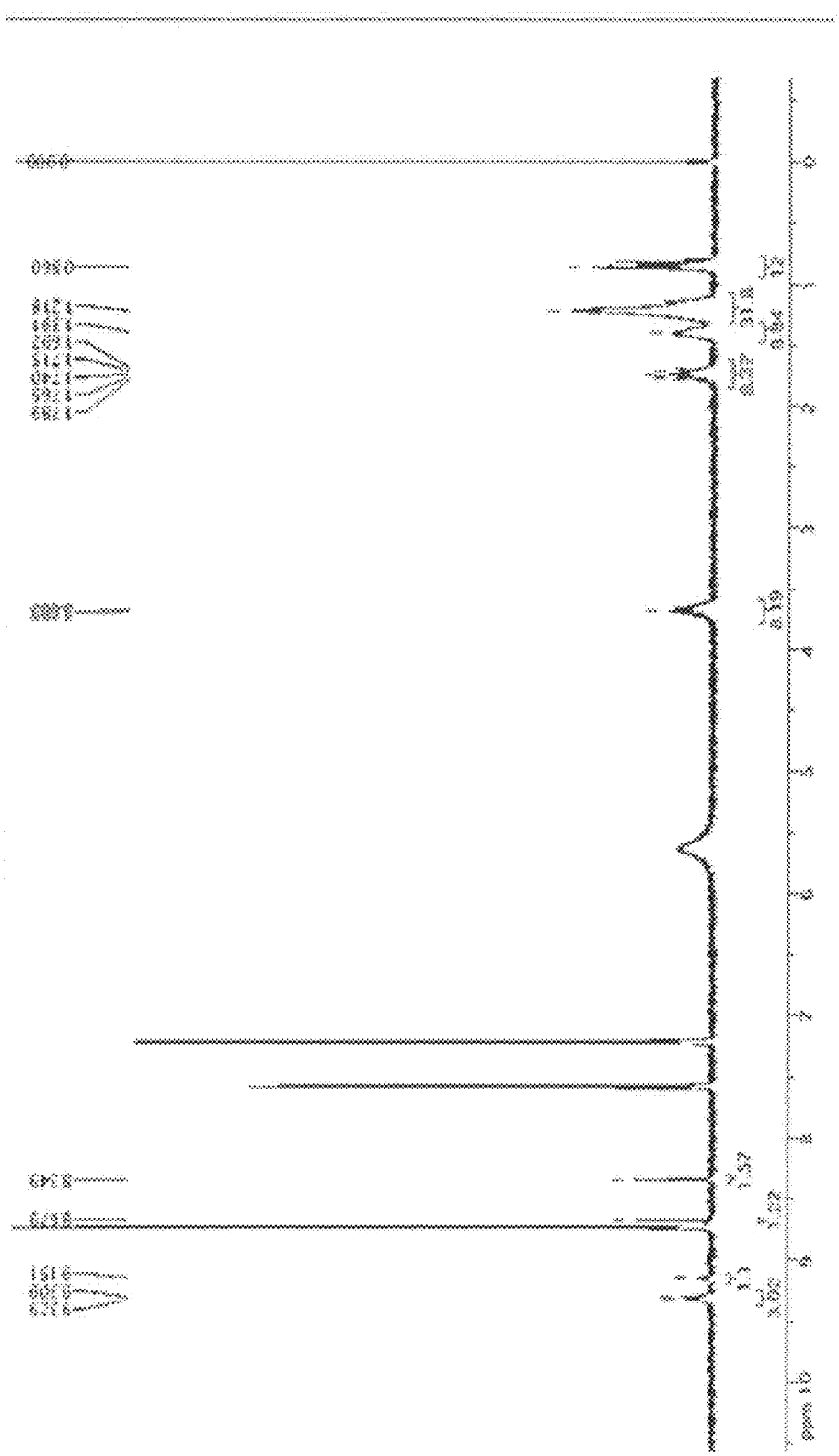
Figure 47:
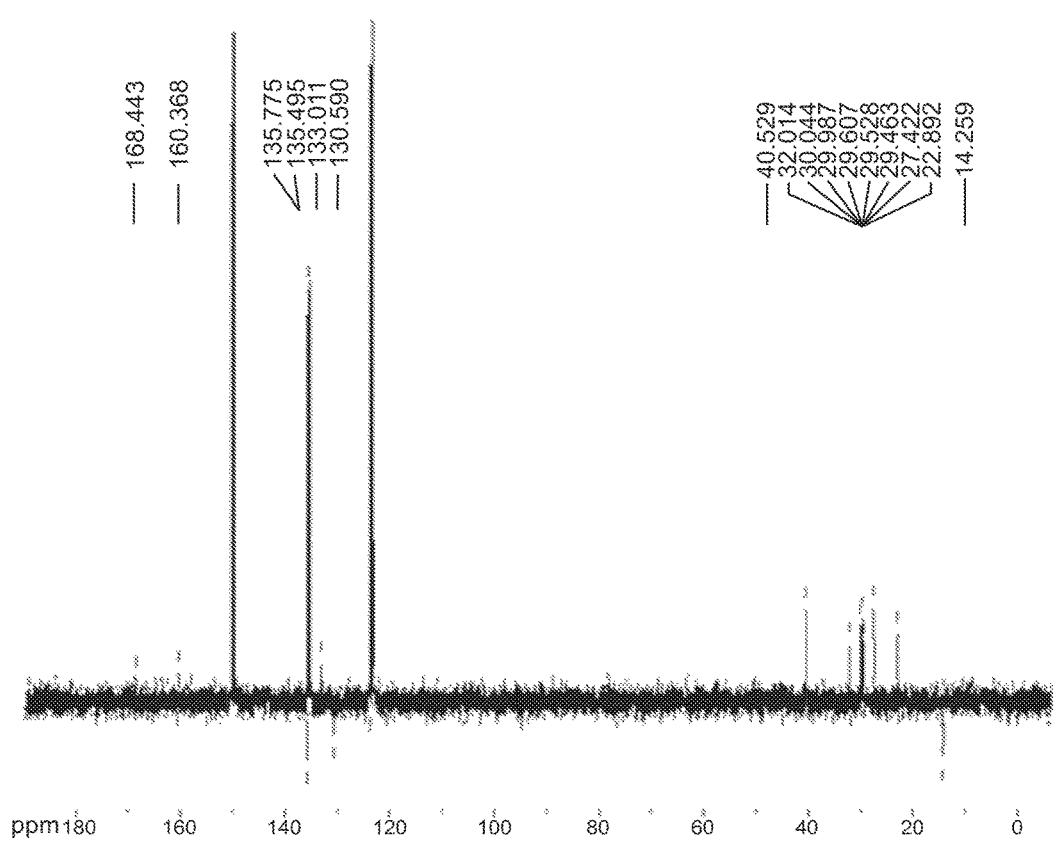
Figure 48:
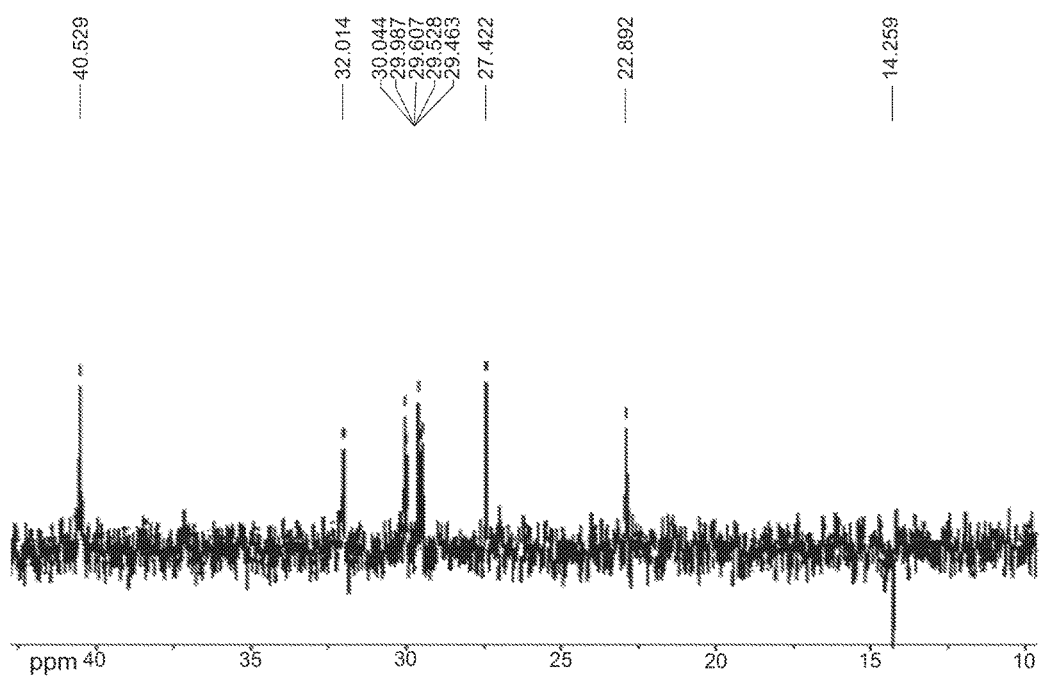

FIG. 3 presents viscosity testing results for the gelling agent as indicated in Table 1, above;

FIG. 4 presents viscosity testing results for the gelling agent as indicated in Table 1, above;

FIG. 5 presents viscosity testing results for the gelling agent as indicated in Table 1, above; p FIG. 6 presents viscosity testing results for the gelling agent as indicated in Table 1, above;

FIG. 7 presents viscosity testing results for the gelling agent as indicated in Table 1, above;

FIG. 8 presents viscosity testing results for the gelling agent as indicated in Table 1, above;

FIG. 9 presents viscosity testing results for the gelling agent as indicated in Table 1, above;

FIG. 10 presents viscosity testing results for the gelling agent as indicated in Table 1, above;

FIG. 11 presents viscosity testing results for the gelling agent as indicated in Table 1, above;

FIG. 12 presents viscosity testing results for the gelling agent as indicated in Table 1, above;

FIG. 13 presents viscosity testing results for the gelling agent as indicated in Table 1, above;
FIG. 14 presents viscosity testing results for the gelling agent as indicated in Table 1, above;
FIG. 15 presents viscosity testing results for the gelling agent as indicated in Table 1, above;
FIG. 16 presents viscosity testing results for the gelling agent as indicated in Table 1, above;
FIG. 17 presents viscosity testing results for the gelling agent as indicated in Table 1, above;
FIG. 18 presents viscosity testing results for the gelling agent as indicated in Table 1, above;
FIG. 19 presents viscosity testing results for the gelling agent as indicated in Table 1, above;
FIG. 20 presents viscosity testing results for the gelling agent as indicated in Table 1, above;
FIG. 21 presents viscosity testing results for the gelling agent as indicated in Table 1, above;
FIG. 22 presents viscosity testing results for the gelling agent as indicated in Table 1, above;
FIG. 23 presents viscosity testing results for the gelling agent as indicated in Table 1, above;
FIG. 24 presents viscosity testing results for the gelling agent as indicated in Table 1, above;
FIG. 25 presents viscosity testing results for the gelling agent as indicated in Table 1, above;
FIG. 26 presents viscosity testing results for the gelling agent as indicated in Table 1, above;
FIG. 27 presents viscosity testing results for the gelling agent as indicated in Table 1, above;
FIG. 28 presents viscosity testing results for the gelling agent as indicated in Table 1, above;
FIG. 29 presents viscosity testing results for the gelling agent as indicated in Table 1, above;
FIG. 30 presents viscosity testing results for the gelling agent as indicated in Table 1, above;
FIG. 31 presents viscosity testing results for the gelling agent as indicated in Table 1, above;
FIG. 32 presents viscosity testing results for the gelling agent as indicated in Table 1, above;
FIG. 33 presents viscosity testing results for the gelling agent as indicated in Table 1, above;
FIG. 34 presents viscosity testing results for the gelling agent as indicated in Table 1, above;
FIG. 35 presents viscosity testing results for the gelling agent as indicated in Table 1, above;
FIG. 36 presents viscosity testing results for the gelling agent as indicated in Table 1, above;
FIG. 37 presents viscosity testing results for the gelling agent as indicated in Table 1, above;
FIG. 38 presents viscosity testing results for the gelling agent as indicated in Table 1, above;
FIG. 39 presents viscosity testing results for the gelling agent as indicated in Table 1, above;
FIG. 40 is a graph of the data from FIG. 39, illustrating viscosity at different shear rates.
FIG. 41 is a graph of shear rate v. shear stress from the data of FIG. 39, illustrating non-newtonian behavior.
FIG. 42 is a graph of viscosity v. concentration for TB in cyclohexane.
FIG. 43 is an illustration of various pyromellitamide rotamers.
FIG. 44 is an $^1$H NMR spectrum for TH.
FIG. 45 is a $^{13}$C NMR spectrum for TH.
FIG. 46 is an $^1$H NMR spectrum for TO.
FIGS. 47 and 48 are $^{13}$C NMR spectra for TO.

Figure 49:
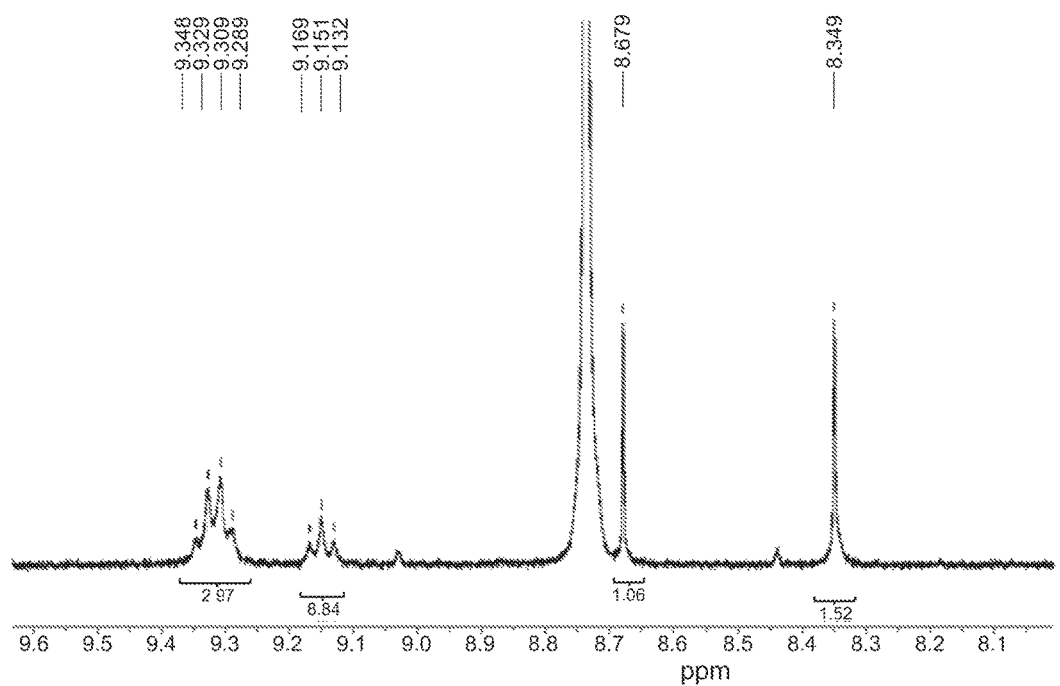
Figure 50:
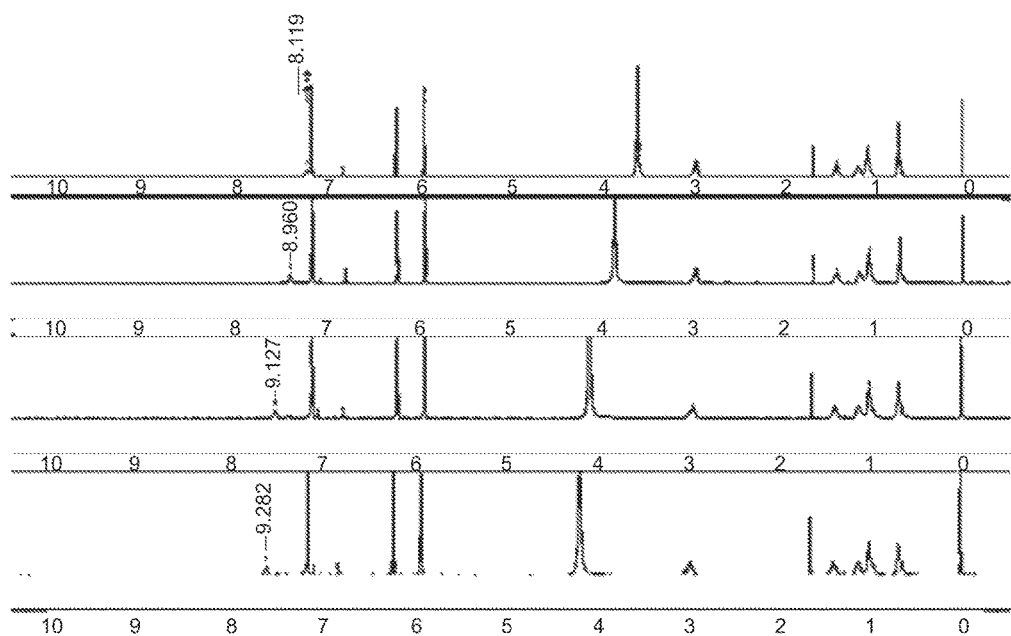
Figure 51:
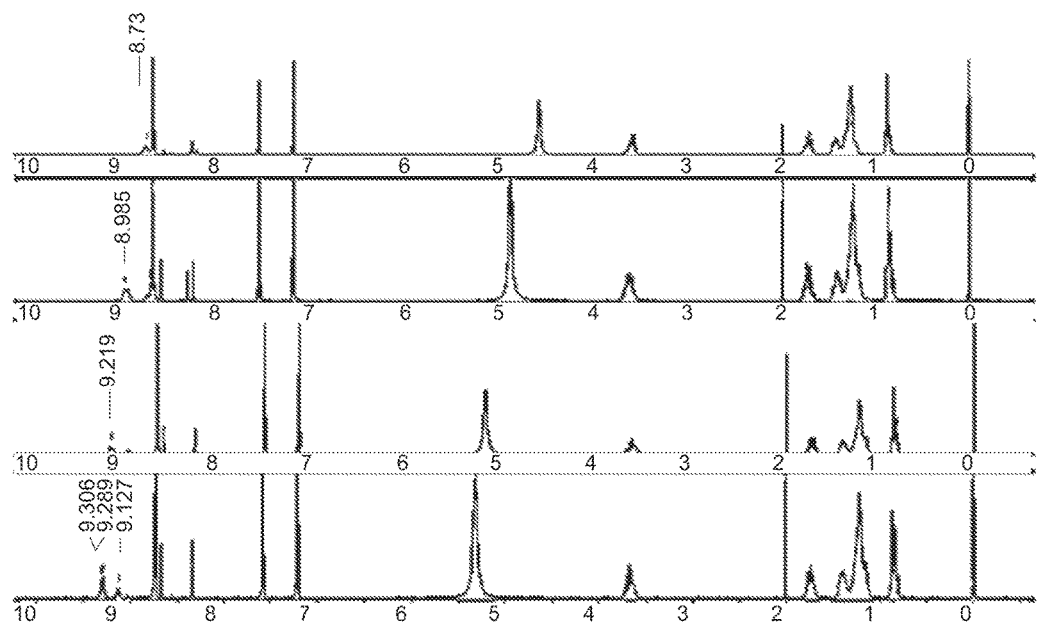
Figure 52:
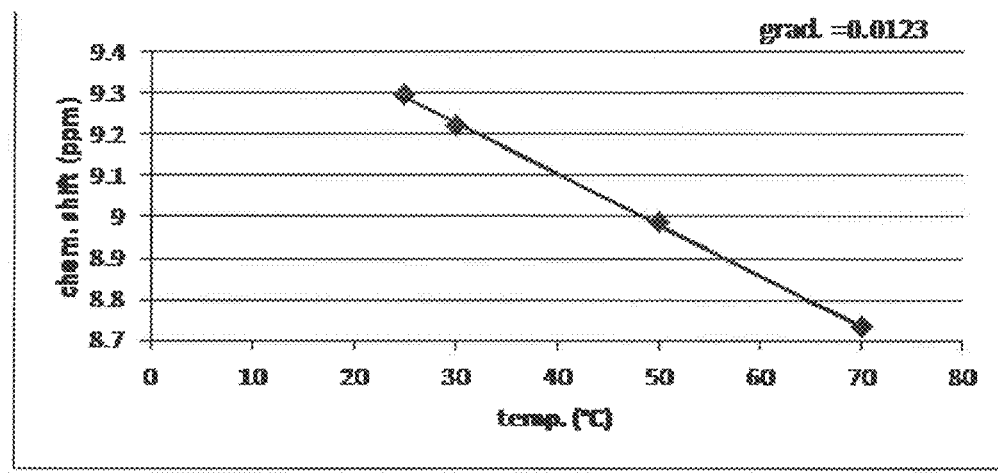
Figure 53:
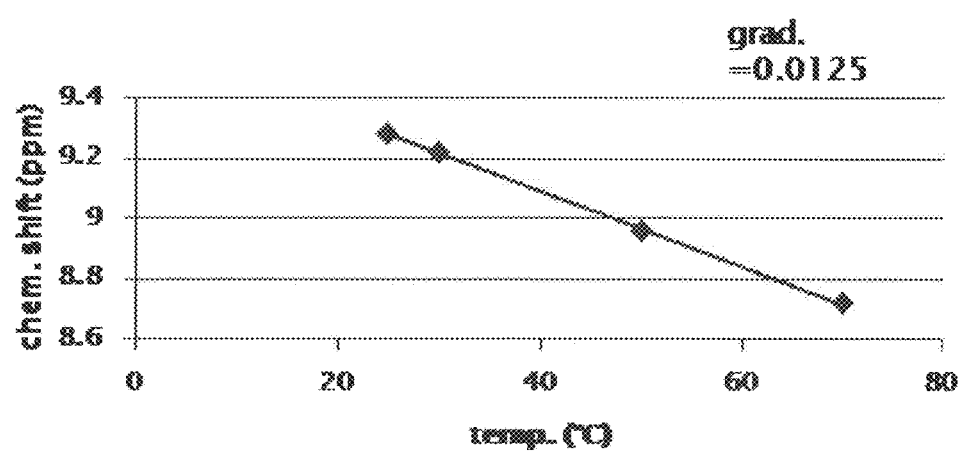
Figure 54:
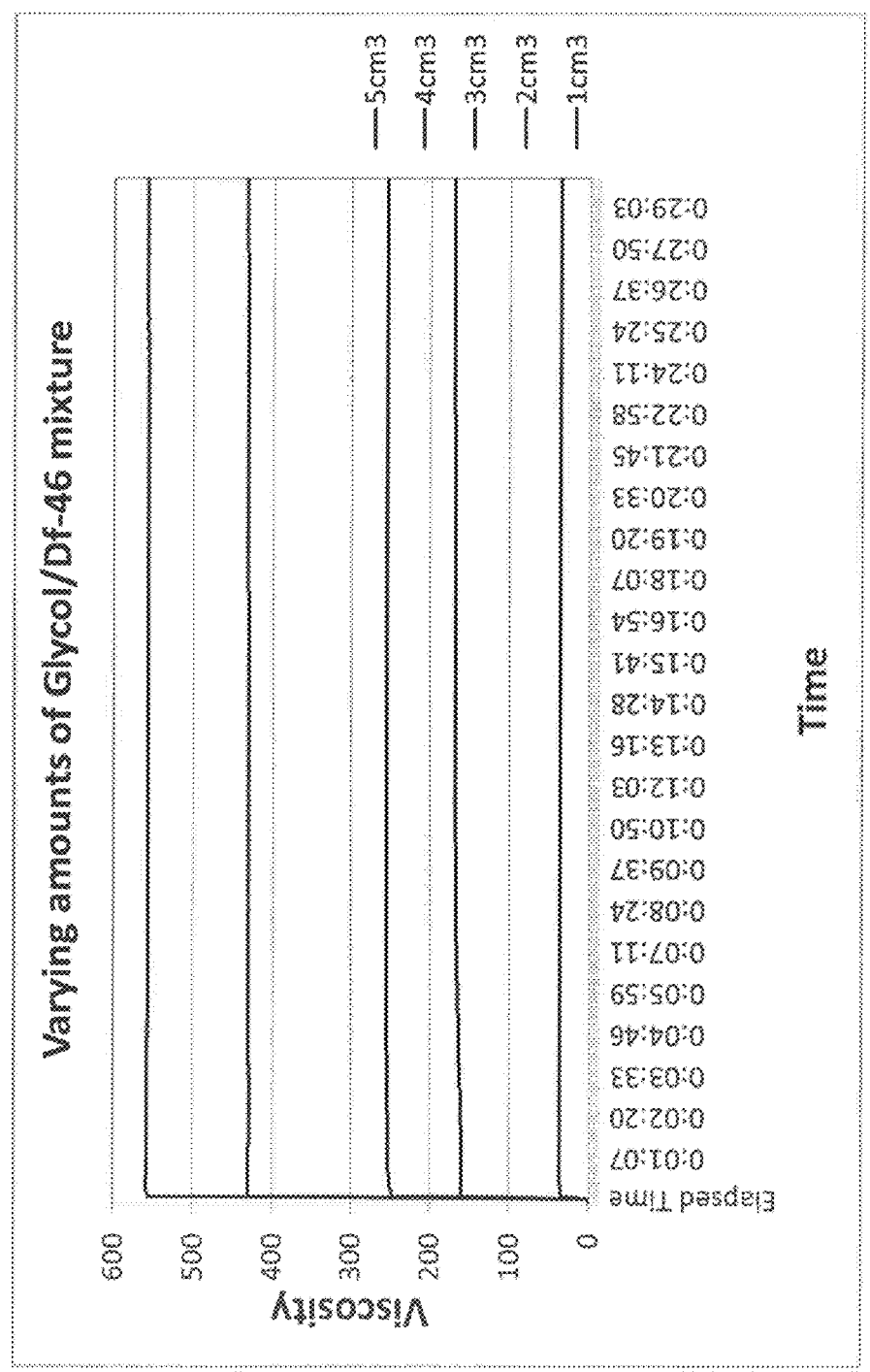
Figure 55:
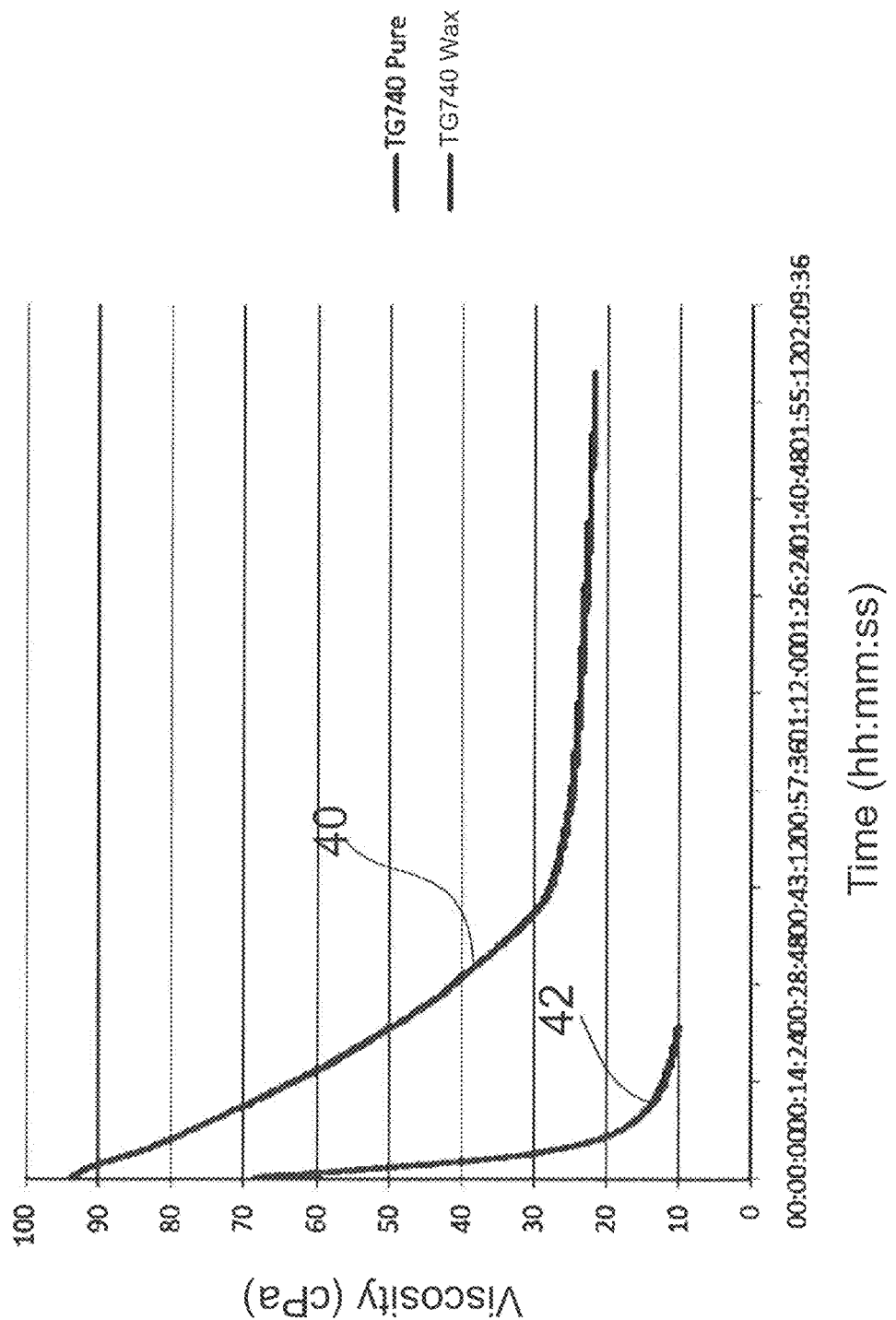
Figure 56:
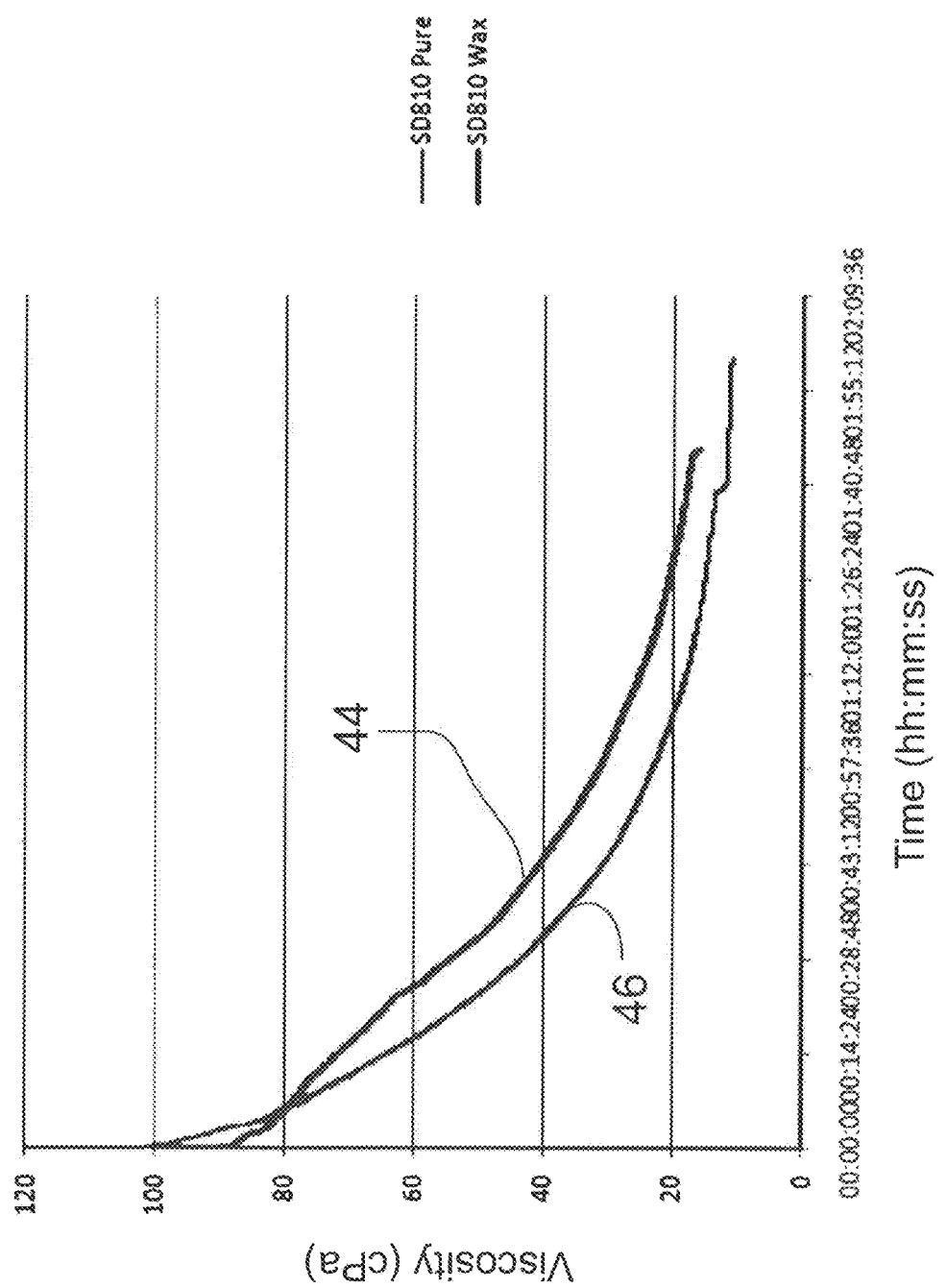
Figure 57:
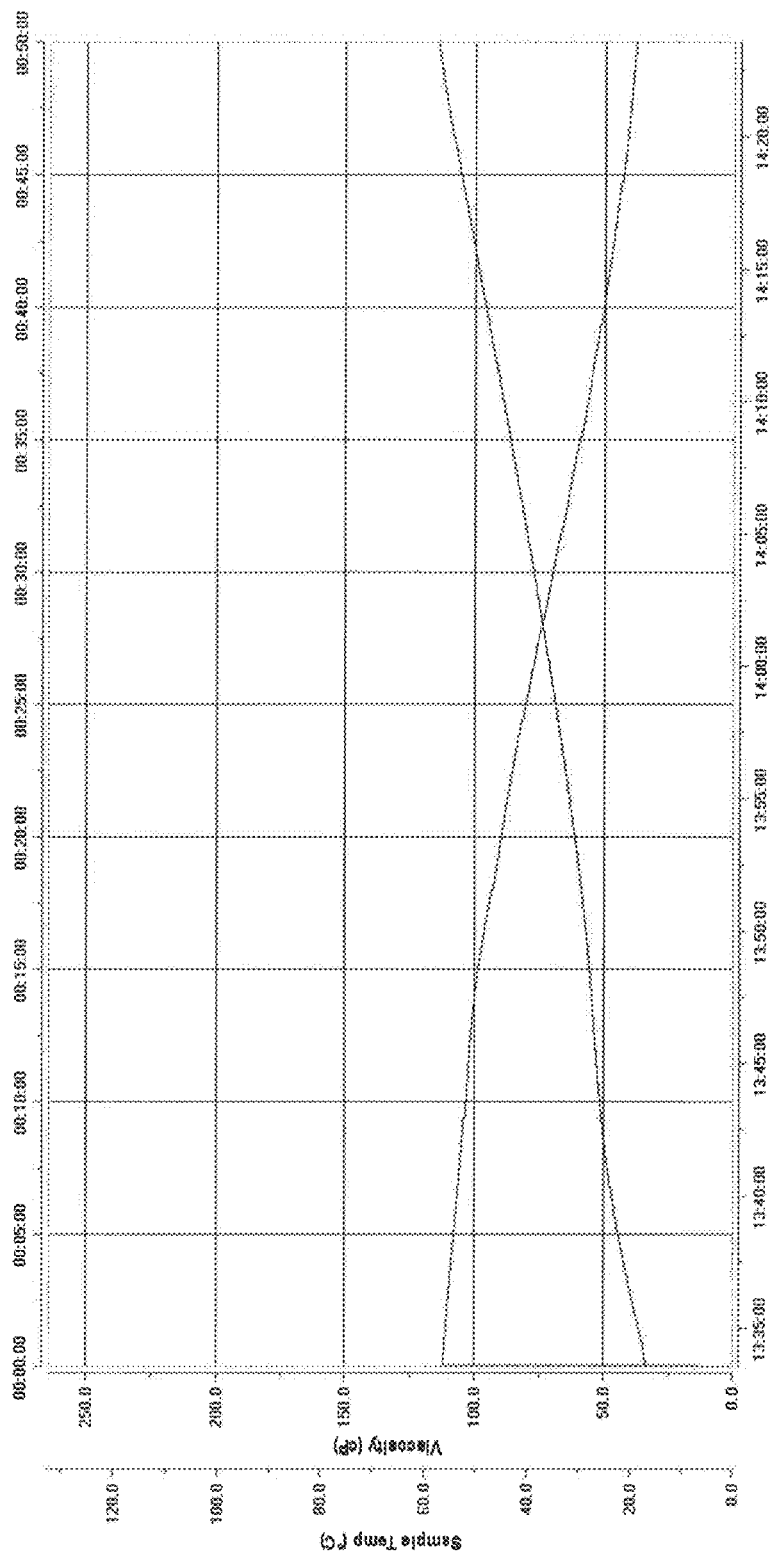
Figure 58:
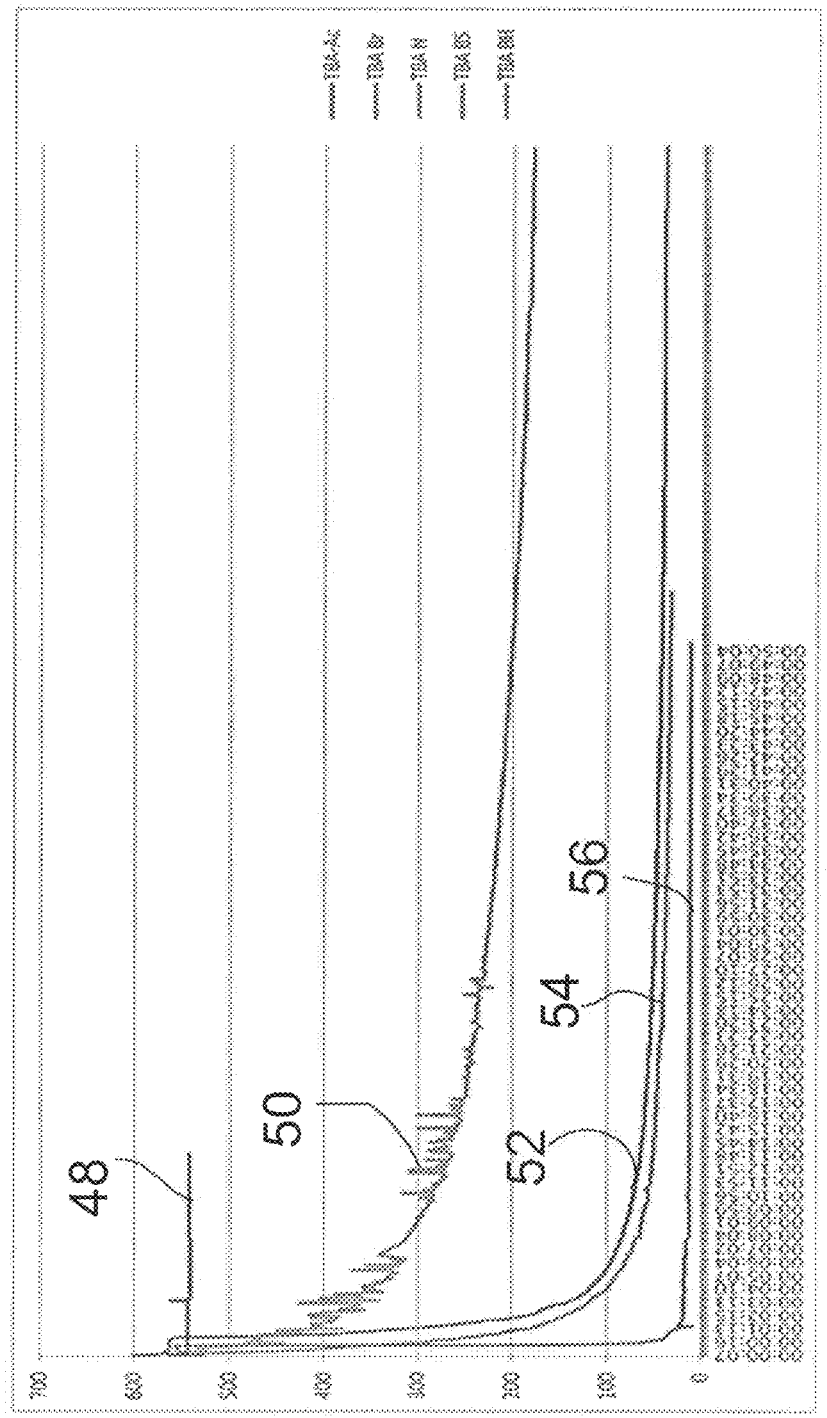
Figure 59:
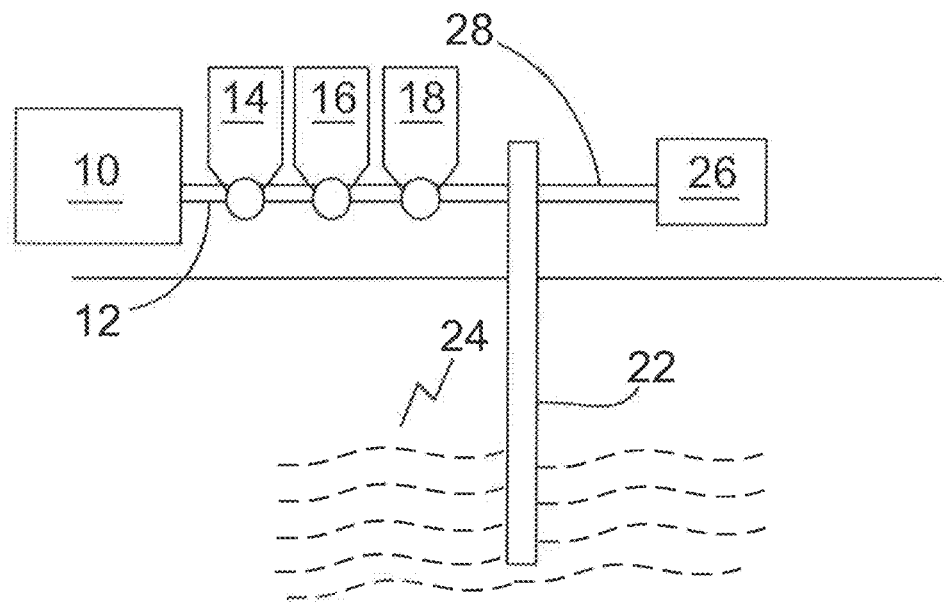
Figure 60:
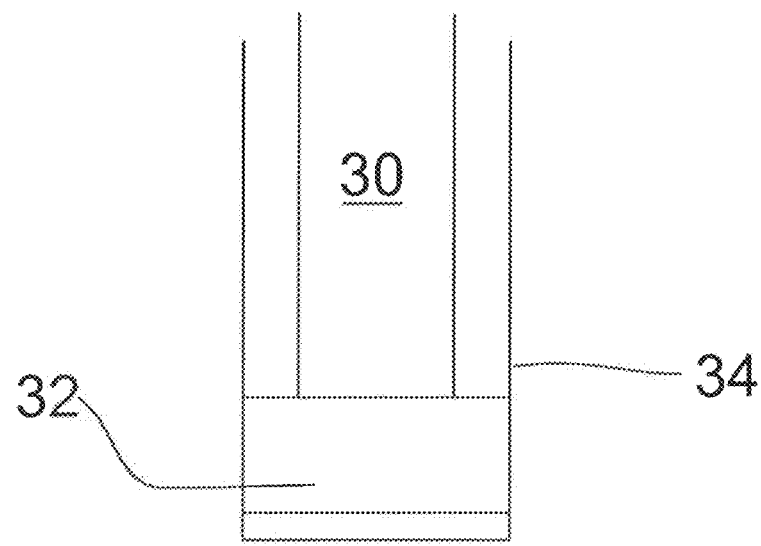

FIG. 48 is an expansion of a portion of the spectrum from FIG. 47 that illustrates the alkyl peaks.
FIG. 49 is an expansion of the $^1$H NMR spectrum for TO from FIG. 46.
FIG. 50 is $^1$H NMR spectra for TH at varying temperatures of 25, 30, 50, and 70° C. from the bottom spectrum to the top spectrum respectively.
FIG. 51 is $^1$H NMR spectra for TO at varying temperatures of 25, 30, 50, and 70° C. from the bottom spectrum to the top spectrum respectively.
FIG. 52 is a graph of the amide hydrogen shift temperature dependence for TO.
FIG. 53 is a graph of the amide hydrogen shift temperature dependence for TH.
FIG. 54 is a graph of the viscosities achieved with various amounts of glycol added to TG740 frac fluid. The glycol solution was made up of 0.87 g tetra hexyl pyromellitamide (TH) in 100 mL of glycol with Dynol™ 604 surfactant (15 mM TH concentration).
FIG. 55 is a graph of viscosity v. time of a gelled mixture of 5 mM TH in TG740 after addition of tetrabutyl ammonium bromide in pure form and in wax form.
FIG. 56 is a graph of viscosity v. time of a gelled mixture of 5 mM TH in SD810 after addition of tetrabutyl ammonium bromide in pure form and in wax form.
FIG. 57 is a graph of viscosity and temperature v. time for 10 mM N,N',N'''-trihexyl, N''''-benzyl benzene-1,2,4,5-tetracarboxamide in SF840.
FIG. 58 is a graph of viscosity v. time for various tetrabutyl ammonium derivative breakers.
FIG. 59 is side elevation view illustrating a system and method of making a downhole fluid and a method of using a downhole fluid.
FIG. 60 is a side elevation view of a drill bit drilling a well.

DETAILED DESCRIPTION

Immaterial modifications may be made to the embodiments described here without departing from what is covered by the claims.

Pyromellitamides have the general base structure (1) shown below:

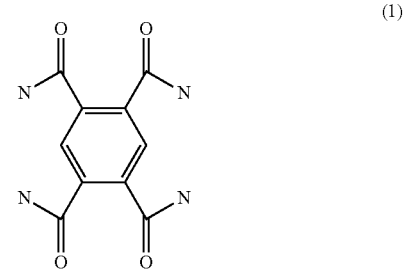 [SMILES: NC(=O)c1cc(C(N)=O)c(C(N)=O)cc1C(N)=O]

(1)

Pyromellitamides are disclosed in this document as being useful gelling agents for downhole fluids. For example, a suitable gelling agent may have the general formula of:

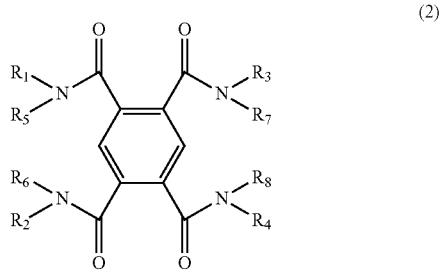

(2)

with $R_1$, $R_2$, $R_3$, $R_4$, $R_5$, $R_6$, $R_7$, and $R_8$ each being a hydrogen or an organic group. $R_5$, $R_6$, $R_7$, and $R_8$ may each be hydrogens and one or more or all of $R_1$, $R_2$, $R_3$, and $R_4$ may each be an alkyl group. In some cases, $R_1=R_2=R_3=R_4$. $R_1$, $R_2$, $R_3$, and $R_4$ may each have 6 carbon atoms, for example 6-10 or 6-24 carbon atoms. Each alkyl group may be one or more of straight chain, branched, aromatic, or cyclic. However, preferably each alkyl group is straight chain, for example if $R_5$, $R_6$, $R_7$, and $R_8$ are each hydrogens, and $R_1$, $R_2$, $R_3$, and $R_4$ are each straight chain alkyl groups with 6-10 carbon atoms. In one example, $R_1$, $R_2$, $R_3$, $R_4$, $R_5$, $R_6$, $R_7$, and $R_8$ are a hydrogen or a C7-24 alkyl group. The organic groups may include functional groups such as esters. In addition to the pyromellitamides synthesized and tested below, example pyromellitamides synthesized and successfully used to gel TG740 include compounds where $R_5$, $R_6$, $R_7$, and $R_8$ are each hydrogens, and $R_1=R_2=R_3=R_4$, and $R_1$ equals n-pentyl (from 1-pentylamine used in amide synthesis), $R_1$=CH(Me)CH2CH3 (from 2-aminobutane used in amide synthesis), $R_1$=CH(Me)CH2CH2CH2CH2CH3 (from 2-aminoheptane used in amide synthesis), $R_1$=CH(Me)CH2CH2CHMe2 (from 2-amino-5-methylhexane used in amide synthesis), and $R_1$=CH2CH(Et)CH2CH2CH2CH3 (from 2-ethylaminohexane used in amide synthesis). Also tested were tetracyclohexyl, tetrabenzyl, tetraallyl, tetra n-butyl and tetra t-butyl pyromellitamides.

Downhole fluids, such as downhole treatment fluids, containing such gelling agents may comprise a base fluid, such as a hydrocarbon base fluid for example with 3-8 carbon atoms, for further example liquefied petroleum gas. In other embodiments C3-24 hydrocarbon fluids may be used. In some embodiments, the gelling agent and the downhole fluid contain no phosphorus. The basic structure of a pyromellitamide gelling agent is believed to be primarily responsible for the gellation mechanism, with variation in the side chains being useful to tailor the resultant gel. The successful tests reported here support use of pyromellitamide gels with other non-tested base fluids, for example non-polar and hydrocarbon based fluids.

Downhole fluids may also comprise a suitable breaker, such as an ionic salt, for example comprising one or more of a bromide a chloride, an organic salt, and an amine salt, such as a quaternary amine salt. Small anion cooperativity (1 equivalent) (e.g. chloride>acetate>bromide>nitrate) may induce the gel to solution transition by decreasing viscosity by a factor of 2-3 orders of magnitude. The time for the gel to collapse may be proportional to the binding strength of the anion.

The breaker may comprise one or more of an alcohol or alkoxide salt, for example with 2 or more carbon atoms, such as propanol. The alkoxide salt may comprise aluminium isopropoxide. In some cases the breaker may need a source of water to activate the breaker to break the gel, for example if a solid alkoxide like aluminium isopropoxide is used. The water source used may be connate water from the formation. In some cases a hydrate or other compound capable of releasing water at a delayed rate may be used for example by inclusion in the injected downhole fluid. For example, the hydrates disclosed in Canadian patent document no. 2685298 may be used, and include hydrated breakers having a crystalline framework containing water that is bound within the crystalline framework and releasable into the fracturing fluid. For example, hydrates of any one of magnesium chloride, sodium sulfate, barium chloride, calcium chloride, magnesium sulphate, zinc sulfate, calcium sulphate, and aluminum sulphate may be used. NaSO4-10H2O may be used as an example of a sodium sulfate hydrate. An ionic salt hydrate or covalent hydrate could be used. A combination of breaker coating or encapsulation with crystallized water addition may be used.

Another example of a water activatable breaker is a piperidine salt. A breaker with one amine disrupts the hydrogen bond network believed to be responsible for gelling the pyromellitamides. Piperidine is an effective breaking agent but is a liquid and thus not always practical to use as a breaker on a large scale. Therefore the hydrogen chloride salt of piperidine, piperidine hydrochloride was synthesized and tested as a solid breaker. There was no major change in viscosity once the piperidine hydrochloride was added to a 100 mL TH in TG740 gel solution. Once a small amount of water (20 drops) was added the solution's viscosity decreased noticeable although the two layers seemed slightly immiscible as there were several bubbles in the solution.

An exemplary procedure for synthesizing a piperidine salt, in this case piperidine hydrogen chloride is as follows. A round bottom flask was charged with aqueous hydrochloric acid (2 M, 58.5 mL) before being cooled to 0° C. using an ice bath. Piperidine (10.0 g, 117 mmol, 11.6 mL) was added dropwise over 30 minutes whilst the solution was stirred vigorously. Once all the piperidine had been added the solvent was removed and the yellow solid recrystallised from ethanol, filtered and washed with cold ethanol to give the desired piperidine hydrochloride as a white solid. Yield was 0.95 g, 7.82 mmol, 6.7%, mp: 245° C., (lit. 246-247° C.).

Breakers that were tested and showed a noticeable decrease in viscosity once added to the gel include: 1-dodecanol>98%, Benzyltriethylammonium chloride 99%, Tetrabutylammonium hydrogen sulfate 99%, Sodium tosylate 95%, Iron (III) sulfate 97%, 2-Chloride-N—N-diethylethylamine hydrogen chloride 99%, Thiodiglycolic acid 98%, Pyruvic acid 98%, 2-hydroxybenzyl alcohol 99%, Azelaic acid 98%, Glutaric acid 99%, Malonic acid 99%, 1-octylamine 99%, Cyclohexylamine 99%, L-ascorbic acid 99% Acetamide 99% Poly(vinyl) alcohol 89,000-98,000 99%, Ethylenediamine 99.5%, Beta-alanine 99%, L-proline 99%, Breakers that were tested and showed a slight decrease in viscosity once added to the gel include: Benzyltributylamonium chloride>98%, T-butanol anhydrous 99.5%, 2-ethyl-1-butanol 98%, 2-ethyl-1-hexanol 99.6%, 1-hexanol 99%, 1-butanol 99.8%, 2-aminobutane 99%, 2-ethyl-1-hexylamine 98%, Benzylamine 99%, Piperidine 99%, Propan-2-ol 99.7%, Benzyltrimethylammonium hydroxide 40 wt % in methanol, Tetra-n-butylammonium hydroxide 40 vol % in water.

The breaker may be configured to delay breaking action. For example, a time delay breaker may be achieved by coating the breaker, for example with a material selected to release the breaker at a predetermined rate over time downhole, for example wax. Referring to FIGS. 55-56, graphs are provided that illustrate the delay in breaking action when a wax coating is used on a breaker, in this case tetrabutyl ammonium bromide (pure form, lines 42 and 46, wax, lines 40 and 44). 5 mM solutions of TH were prepared in both TG740 and SD810 and the molar equivalent of tetrabutyl ammonium bromide (0.8 g) or wax-coated tetrabutyl ammonium bromide (1.0 g) was added to the solutions. The change in viscosity was measured using a chandler viscometer. The results the TH mixture with TG740 showed initial viscosities of 93.6 and 68.3 cPa for waxed and unwaxed breaker, respectively while the SD810 showed initial viscosities of 97.7 cPa and 100.3 for waxed and unwaxed breaker, respectively. With TG740 there was a marked difference between the wax coated and pure breaker while with SD810 the difference was muted although delayed action was observed. The wax breaker action in SD810 had a slower rate in the drop in viscosity compared with the pure breaker. However both waxed and unwaxed breaker in SD810 showed a slower rate of degradation compared to that done with TG740. Compounds that were tested as breakers and showed no decrease in viscosity once added to the gel include: 1,3-dihydroxyl benzene (resorcinol) 99%, Diphenylacetic acid 99%, Imidazole 99%, Propionamide 97%, Magnesium carbonate, Citric acid 99.5%, Benzoic acid 99.5%, Phenylacetic acid 99%, Potassium phthalimide 98%, Pentaerythrite 99%, 1-butylamine 99.5%, 1-hexylamine 99%, Hydroxylamine hydrogen chloride 98%, Ethanolamine 98%, L-histidine 99%, Aspartic acid 98%, Glycine 99%, D-Sorbitol 98%, Potassium tertbutoxide 95%, Piperazine 99%, Diethanolamine 98%, L-menthol 99%, Lactic acid 85%, Mandelic acid 99%, Ammonium acetate 98%, Paraformaldehyde 95%, Hydroquinone 99%, Tetramethylammonium hydroxide 25 vol % in water Referring to FIG. 58, a comparison of various tetrabutyl ammonium derivative breakers is illustrated. Reference numerals 48, 50, 52, 54, and 56, identify the viscosity v. time curves of TG740 gelled with TH and broken with tetrabutyl bisulfide, tetrabutyl nitrate, tetrabutyl bromide, tetrabutyl borohydride, and tetrabutyl acetate, respectively. Tetrabutyl bisulfide showed no breaker activity, while at least tetra butyl nitrate showed delayed breaker characteristics. The latter three tetrabutyl derivatives showed fast breaker action. In some embodiments non halogenated breakers may be used as a less toxic alternative to halogenated breakers.

The downhole fluids disclosed herein may incorporate other suitable chemicals or agents such as proppant. The downhole treatment fluids disclosed herein may be used in a method, for example a fracturing treatment as shown in FIG. 59, of treating a downhole formation. The gelling agents may be used in oil recovery enhancement techniques.

Referring to FIG. 59, a method and system is illustrated, although connections and other related equipment may be omitted for simplicity of illustration. A base fluid, such as a hydrocarbon frac fluid, is located in storage tank 10 and may be passed through piping 12 into a well 22 and introduced into a downhole formation 24, such as an oil or gas formation. Gel may be combined with the base fluid to make a downhole fluid. For example, gel may be added on the fly from a gel tank 14, or may be pre-mixed, for further example in tank 10. Other methods of gelling the base fluid may be used. For example batch mixing may be used to make the gel. Other storage tanks 16 and 18 may be used as desired to add other components, such as proppant or breaker, respectively to the downhole fluid.

The gelling agent may be provided with a carrier, for example an inert carrier like glycol (ethylene glycol). Referring to FIG. 54, a graph of the viscosities achieved by mixing into TG 740 varying amounts of a solution of glycol with 15 mM TH is shown. The gel was initially formed after 30 seconds of blending in TG-740 frac fluid. As the concentration of glycol increased, the viscosity of the final mixture increased. Gel formation was almost immediate. Glycol is considered suitable because the gelling agent won't gel the glycol. Instead, the carrier provides a medium for dispersing the gelling agent as a dissolved liquid or suspended solid prior to being combined with base fluid. The gelling agent may be ground prior to mixing with carrier if the gelling agent is solid, in order to facilitate dispersion or dissolution. Once mixed with base fluid, the carrier dissolves in the base fluid, for example hydrocarbon base fluid, facilitating dissolution of the gelling agent in the base fluid without interfering with gelling. Using a carrier allows the gelling agent to be stored or transported in a low viscosity state within the carrier whilst facilitating quicker dissolution into and hence quicker gelling within the base fluid than could be accomplished with solid or neat gelling agent. Other carriers may be used including acetonitrile or glycerine, for example thamesol.

To facilitate dispersion in the carrier the gelling agent may be provided with a suspending agent such as clay. The suspending agent may act as a thickener to suspend the gel in the carrier. The suspending agent helps to maintain the gelling agent in homogeneous dispersion within the carrier, and slows or stops the gelling agent from settling within the carrier. Other suspending agents may be used, such as various polymers.

The gelling agent may be provided with a wetting agent, such as a surfactant. For example, in the mixture tested in FIG. 54, DYNOL™ 604 surfactant by Air Products™ is used as the surfactant. DF-46 is the glycol/DYNOL™ 604/pyromelitamide mixture. The wetting agent may be used to help wet the surface of the solid pyromelitamide, thus speeding up the dissolution of the solid and improving time to gel. For example, time to achieve viscosity may be under four minutes and further under a minute or 30 seconds for a mixture of hydrocarbon base fluid and a solution of pyromellitamide gelling agent, glycol, suspending agent, and DYNOL™ 604 surfactant. Other wetting agents may be used, such as DYNOL™ 607.

Referring to FIG. 59 the downhole fluid may be recovered from the downhole formation 24, for example through a recovery line 28, and recycled, for example using one or more recycling apparatuses 26. The recycling stage may incorporate removal of one or more compounds within the recovered fluid, for example if breaker is removed. Distillation may be used, for example to remove alcohol or amine, and aqueous separation may be used, for example to remove salts.

When the R groups contain non alkyl functionality, for example as shown below in structure (3) with ester functionality, aggregation may be inhibited compared to when the R groups are alkyl. This effect may be attributed to the fact that the ester group increases polarity of the compound, thus decreasing solubility in hydrocarbon fluids, and the ester group reduces geometric compatibility with the alkyl containing hydrocarbon fluids used.

(3)

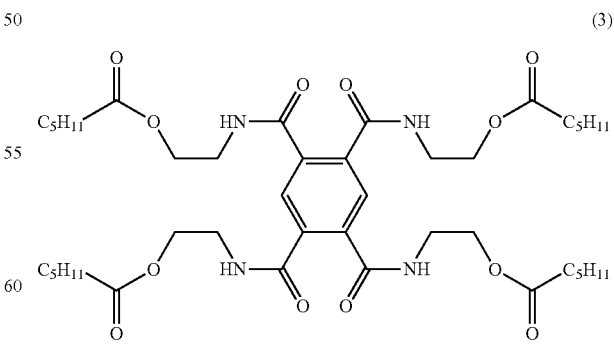

Exemplary Synthesis and Related Testing

The synthesis of tetra alkyl pyromellitamides may be carried out in two stages, although other routes and stages may be used:

1. benzene-1,2,4,5-tetracarbonyl tetrachloride (4) synthesis:

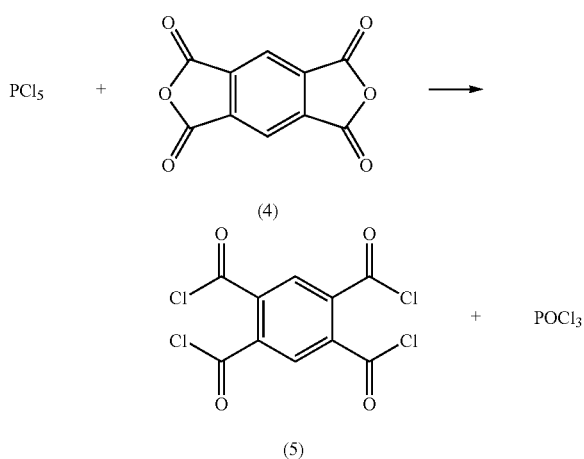

2. amide synthesis:

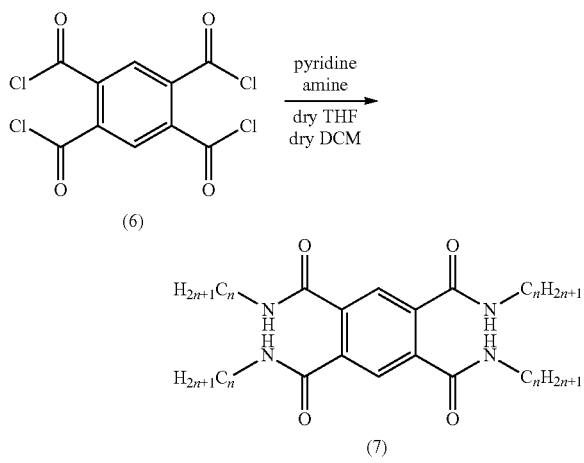

n = 4, 6, 8, 10

An exemplary procedure for route 1 is as follows. Phosphorus pentachloride (45 g, 0.22 mol) and pyromellitic anhydride (25 g, 0.11 mol) were placed in a round bottom flask and mixed together. A hair dryer was used to heat one spot of the flask to initiate the reaction, causing liquid POCl3 to be produced. Once the reaction had been initiated an oil bath was used to heat the flask to continue the reaction. Once all the solid had melted the POCl3 by-product was distilled off (80-95° C.), and the product was then reduced under vacuum (150-180° C.) using a Kugelrohr machine, yielding the desired product as a white solid (23.7838 g, 73.0 mmol, 66.4%).

An exemplary procedure for route 2 is as follows, albeit without using pyridine. Benzene-1,2,4,5-tetracarbonyl tetrachloride (2.0 g, 6.0 mmol) in dry tetrahydrofuran (15 mL, 185.0 mmol) was added dropwise to a solution of triethylamine (3.5 mL, 25.0 mmol), hexylamine (3.23 g, 31.2 mmol) in dichloromethane (15 mL, 235.0 mmol) and dry tetrahydrofuran (15 mL, 185.0 mmol) whilst the solution was stirred vigorously. After addition was complete the reaction was allowed to stir overnight at room temperature, before the product was filtered off and the solvent removed using a rotary evaporator. The crude product was subsequently washed with methanol and acetone to give the desired pure product as a white solid. Yields achieved ranged from 0.20 g, 0.34 mmol, 5.7%, to 0.49 g, 0.82 mmol, 13.7%, to 1.26 g, 2.11 mmol, 35.2%. In the example procedure that led to the 35.2% yield, the hexylamine and triethylamine solution was cooled to 0° C. before the acid chloride was added. The reaction was also kept at this low temperature throughout the addition of the acid chloride and for an hour after addition had been completed. This alteration in conditions led to less precipitate being formed, which was believed to be the unwanted triethylammonium chloride salt and any imide that had formed, thus showing that low temperatures help form the correct product rather than the unwanted imide, as reflected in the improved yield obtained (35.2%).

Gel Test

To test the samples prepared, a sample of the compound to be tested was placed in a glass vial with a few mL of solvent, and the sample was heated until a clear solution formed or until the boiling point of the solvent was reached. After cooling if viscosity could be detected the compound was said to gel the solvent.

Gelation Mechanism

Figure 1:
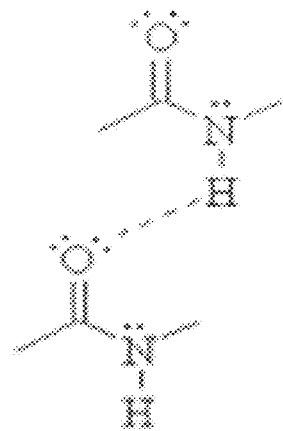
FIG. 1 illustrates hydrogen bond formation.

Referring to FIG. 1, it has been proposed that pyromellitamide gelation is achieved through π-π interactions and primarily intermolecular hydrogen bonds between amide groups, according to the structural interaction shown.

Table 2 below indicates the results of gel testing of four compounds, TB, TH, TO, and TD. TB, TH, TO and TD refer to structure (1) above each with four butyl, hexyl, octyl, or decyl, alkyl groups to give N,N',N'',N'''-tetrabutylbenzene-1,2,4,5-tetracarboxamide (TB), N,N',N'',N'''-tetrahexylbenzene-1,2,4,5-tetracarboxamide (TH), N,N',N'',N'''-tetraoctylbenzene-1,2,4,5-tetracarboxamide (TO), and N,N',N'',N'''-tetradecylbenzene-1,2,4,5-tetracarboxamide (TD), respectively. In Tables 2 and 3, TG indicates the formation of a transparent gel, TG* indicates formation of a transparent gel only with heating, I indicates insoluble, S indicates soluble, P indicates that the compound gels but precipitates on subsequent cooling, PG indicates partial gelling with liquid solvent only after shaking, with the solubility of the molecule requiring heating to get it to dissolve in the liquid, and X equals no gel formed as the compound is not soluble in the liquid.

TABLE 2

Gelling properties of various solvents

| | Toluene | Methanol | Acetone | Water | Ethyl ethanoate | Diethyl ether | Pentane | Hexane | cyclohexane |
|---|---|---|---|---|---|---|---|---|---|
| TB | TG | P | P | I | I | I | I | I | TG* |
| TH | TG | P | P | I | I | TG | TG | TG | TG |
| TO | TG | I | I | I | I | TG | TG | TG | TG |
| TD | TG | I | I | I | I | TG | TG | TG | TG |

Table 2 indicates that TB, TH, TO, and TD gel non-polar, aprotic solvents. This result is consistent with the fact that intermolecular H-bonding is responsible for the gel structure.

TABLE 3

Gelling properties in SYNOIL ™ products

| Compound | TG740 - BP range: 70-170° C. | SF800 - BP range: 125-270° C. | SF840 -BP range: 150-330° C. |
|---|---|---|---|
| TB | X | X | X |
| TH | TG | PG | PG |
| TO | TG | PG | PG |
| TD | TG | PG | PG |
| Decreasing solubility -> | | | |

Table 3 indicates that without agitation not all solvent may be aggregated into the gel. With shaking TG740 obtains uniform viscosity. SF800 and SF840 were never completely incorporated.

Figure 2:
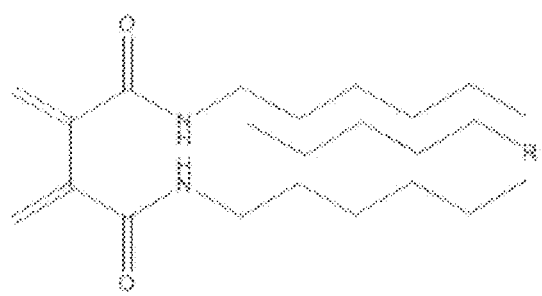
FIG. 2 illustrates a proposed solvation interaction between an alkyl solvent and a pyromellitamide gelling agent with straight chain alkyl groups.

Referring to FIG. 2 and Table 4 below, an explanation of the gel testing results in Tables 2 and 3 may be that alkyl compound chains line up better with alkyl solvent chains than with aromatic solvent chains, which are more polar than straight chain alkyls. In addition, sterics may play a role.

TABLE 4

| SynOil Hydro-carbon Product | Aromatic content | |
|---|---|---|
| TG740 | 10% | Decreasing |
| SF800 | 20% | Gelation |
| SF840 | 35% | ↓ |

The gelling agent may be provided with increased aromatic character in order to improve solvation with aromatic solvents. Referring to FIG. 57 for example, a gelling agent was tested and made with $R_1$, $R_2$, and $R_3$ being hexyl alkyl groups, $R_5$, $R_6$, $R_7$, and $R_8$ being hydrogens, and $R_4$ being a benzyl group to add aromatic character and improve aromatic viscosity. The sample tested in FIG. 57 had a 10 mM concentration in SF840, and illustrated gelling action.

Solvation Temperature Testing.

Referring to FIGS. 3-5 and Table 5 below, viscosity test results for TH, TO, and TD in TG740 at 10 mM concentration are illustrated. The results illustrate that increased chain length=increased solubility as the compound becomes less polar, and decreased viscosity due to reduced H-bond strength. Increased viscosity was almost instant obtained at room temperature. An additional but successful experiment not in the figures or tables involved injecting highly concentrated gelled sample TH in TG740 into ungelled TG740 in a blender at room temperature.

TABLE 5

| Gel type | Max viscosity (cp) | Time (mins) | Min. Temp. (° C.) to Gel |
|---|---|---|---|
| TH | 707 | 85 | 40 |
| TO | 421 | 50 | 29 |
| TD | 256 | 40 | 26 |

As indicated above, TB did not gel TG740. TB was found to be insoluble in TG740, although soluble in cyclohexane. When cyclohexane gelled with TB was injected into TG740, a cloudy dispersion resulted and TG740 was not gelled.

FIGS. 3-30 illustrate viscosity testing results for TB, TH, TO and D as indicated in Table 1 above. Many of the results, for example the results shown in FIGS. 13-15 for TH gelled TG 740, indicate that increasing temperature increased viscosity, which was unexpected.

Referring to FIGS. 31-35 and Table 6, various mixtures of gelling agents were tested. Such mixtures demonstrated thermoreversible gelling, which is in line with the theory that reversible H bonding between molecules was responsible for gelling. The mixture results also demonstrate that gelling is temperature dependent and chain length dependent.

TABLE 6

| | THTO | THTD | TOTD |
|---|---|---|---|
| Max viscosity (cp) | 21 | 15 | 12 |
| Min viscosity (cp) | 13 | 6 | 5 |

Tables 7-10 below illustrate viscosity testing results for TB, TH, TO, and TD, respectively.

TABLE 7

Viscosity test results for TB in cyclohexane

| Conc. (mM) | Max. viscosity (cP) | Temp. max viscosity reached (° C.) | Min. viscosity (cp) | Temp. min viscosity reached (° C.) |
|---|---|---|---|---|
| 10 | 436 | 42 | 303 | 25 |
| 7 | 119 | 25 | 35 | 48 |
| 5 | 85 | 24 | 39 | 47 |
| 4 | 56 | 24 | 16 | 49 |
| 3 | 25 | 25 | 3 | 48 |
| 2 | 20 | 25 | 14 | 48 |
| 1 | 9 | 25 | 4 | 47 |

TABLE 8

Viscosity test results for TH in TG740

| Conc. (mM) | Max. viscosity (cP) | Temp. max viscosity reached (° C.) | Min. viscosity (cp) | Temp. min viscosity reached (° C.) |
|---|---|---|---|---|
| 7 | 301 | 22 | 198 | 27 |
| 5 | 130 | 48 | 107 | 25 |
| 4 | 79 | 40 | 69 | 24 |
| 3 | 45 | 31 | 40 | 48 |
| 2 | 19 | 25 | 9 | 48 |
| 1 | 7 | 24 | 0 | 28 |

TABLE 9

Viscosity test results for TO in TG740

| Conc. (mM) | Max. viscosity (cP) | Temp. max viscosity reached (° C.) | Min. viscosity (cp) | Temp. min viscosity reached (° C.) |
|---|---|---|---|---|
| 7 | 219 | 35 | 196 | 26 |
| 5 | 116 | 38 | 110 | 48 |
| 4 | 83 | 33 | 74 | 48 |
| 3 | 43 | 24 | 33 | 48 |
| 2 | 19 | 25 | 10 | 48 |
| 1 | 7 | 25 | 3 | 48 |

TABLE 10

Viscosity test results for TD in TG740

| Conc. (mM) | Max. viscosity (cP) | Temp. max viscosity reached (° C.) | Min. viscosity (cp) | Temp. min viscosity reached (° C.) |
|---|---|---|---|---|
| 7 | 124 | 26 | 71 | 48 |
| 5 | 64 | 25 | 33 | 48 |
| 4 | 43 | 25 | 19 | 48 |
| 3 | 26 | 25 | 14 | 48 |
| 2 | 8 | 23 | 0 | 47 |
| 1 | 2 | 24 | 0 | 47 |

FIGS. 36-41 illustrate shear testing results for TB in cyclohexane. The results shown in FIGS. 36-39 illustrate that the gels formed may be shear stable, as illustrated by testing with a constant shear rate over time. FIGS. 39-41 examine the viscosity of TB in cyclohexane under a varying shear rate, and illustrate that there is a nonlinear relationship between shear rate and shear stress, thus indicating Non-Newtonian behavior.

Referring to FIG. 42, an examination of TB gelation in cyclohexane at different concentrations illustrated a non-linear relationship between viscosity and concentration as shown. This finding supports the theory that the formation of gels is thought to occur via a hierarchical self-assembly of columnar stacks, helical ribbons and similar aggregates to form a 3D network.

Nuclear Magnetic Resonance Spectroscopy (NMR)

NMR was used to determine molecular structure, and is based on radio frequency emission from high to low spin state as is known in the art. NMR gives information on the type of environment of an atom, the neighboring environment based on the splitting pattern, the number of protons in environment (integral), and the symmetry of the molecule. Given a symmetrical molecule, corresponding proton and carbon environments are expected to be the same. In a symmetrical pyromellitamide the NMR data was thus expected to show 1 peak for the amide protons and 1 peak for the aromatic protons.

Referring to FIGS. 44-51 and Table 11, proton and carbon NMR data is illustrated for TH and TO.

The NMR data appeared to indicate that the pyromellitamides analyzed were unsymmetrical. For example, the $^1$H NMR appears to indicate an unsymmetrical molecule by illustrating that the protons on the benzene ring are in different environments. Referring to The $^1$H data appears to show 1 amide proton in a distinctly unique environment as evidenced by a triplet, whereas the 3 other amide protons are in similar environments as evidenced by overlaid triplets. FIG. 43, examples of possible rotamers are shown that may cause this type of pattern. The molecules in FIG. 43 illustrate from left to right the (syn-syn)-(anti-anti), (syn-syn)-(syn-anti), and the (syn-syn)-(anti-anti) examples.

FIGS. 50-51 illustrate variable temperature (VT) $^1$H NMR Spectra. The VT $^1$H NMR spectra provide evidence for H bonding, as well as evidence of the rotamer interconversion seen as the shape of the amide H peaks changed with increasing temperature indicating a changing environment, thus consistent with the data illustrated in FIG. 16. Referring to FIG. 50, the TH $^1$H NMR VT illustrated a stepwise decrease in chemical shift as the temperature increased. A reduction in the extent of H-bonding as temperature is increased was also shown, which is consistent with the data illustrated in FIG. 16. Referring to FIG. 51, the TO $^1$H NMR VT illustrated an upfield shift, which is conventionally described as negative temperature coefficient. In a hydrogen-bonded amide group, the carbonyl functionality causes the amide proton to be shifted downfield. Increased temperature=increased magnitude of thermal fluctuations=increase in the average distance between atoms. Thus, the hydrogen bond is weakened and the amide proton is shifted downfield to a lesser extent (i.e. a relative upfield shift).

Referring to FIGS. 52-53, both TH and TO show similar amide hydrogen shift temperature dependence.

The disclosed embodiments may provide low viscosity gels or high viscosity gels. An example of a low viscosity gel (2-50 cp) is SLICK OIL™ designed application is for tight oil and gas formations. High viscosity gels may require addition of a breaker.

The base components of TG740, SF800 and SF 840 are alkanes, isoalkanes and aromatic hydrocarbons. TG740, SF800 and SF 840 are frac fluids available for sale under the same or different names at various refineries in North

TABLE 11

NMR peak data

| FIG. | Gelling agent | NMR Type | Peak assignment |
|---|---|---|---|
| 44 | TH | $^1$H | N,N',N'',N'''-tetrahexylbenzene-1,2,4,5-tetracarboxamide $\delta_H$ (300 MHz, d$_5$-pyridine, Me$_4$Si) 0.75-0.85 (12H, m, C$\underline{H}_3$), 1.15-1.27 (16H, m, C$\underline{H}_2$), 1.30-1.42 (8H, m, C$\underline{H}_2$), 1.69-1.77 (m, 8H, C$\underline{H}_2$), 3.56-3.71 (8H, m, C$\underline{H}_2$), 8.37 (1H, s, C$\underline{H}$), 8.69 (1H, s, C$\underline{H}$), 9.20 (1H, m, N$\underline{H}$) and 9.29 (3H, m, N$\underline{H}$). |
| 45 | TH | $^{13}$C | N,N',N'',N'''-tetrahexylbenzene-1,2,4,5-tetracarboxamide $\delta_C$ (75 MHz, d$_5$-pyridine, Me$_4$Si) 14.2 (CH$_3$), 22.9 (CH$_2$), 27.1 (CH$_2$), 29.9 (CH$_2$), 31.8 (CH$_2$), 40.5 (CH$_2$), 168.3 (C=O). |
| 46/49 | TO | $^1$H | N,N',N'',N'''-tetraoctylbenzene-1,2,4,5-tetracarboxamide $\delta_H$ (300 MHz, d$_5$-pyridine, Me$_4$Si) 0.81-0.89 (12H, m, C$\underline{H}_3$), 1.10-1.30 (32H, m, C$\underline{H}_2$), 1.36-1.47 (8H, m, (C$\underline{H}_2$), 1.74 (8H, tt, C$\underline{H}_2$, J = 7.5 Hz), 3.59-3.76 (8H, m, C$\underline{H}_2$), 8.35 (1H, s, C$\underline{H}$), 8.68 (1H, s, C$\underline{H}$), 9.15 (1H, t, N$\underline{H}$, J = 5.7 Hz) and 9.319 (3H, m, NH). |
| 47/48 | TO | $^{13}$C | N,N',N'',N'''-tetraoctylbenzene-1,2,4,5-tetracarboxamide $\delta_C$ (75 MHz, d$_5$-pyridine, Me$_4$Si) 14.3 (CH$_3$), 22.9 (CH$_2$), 27.4 (CH$_2$), 29.5 (CH$_2$), 29.6 (CH$_2$), 30.0 (CH$_2$), 32.0 (CH$_2$), 40.5 (CH$_2$), (2 aromatic peaks obscured by pyridine solvent peaks), 130.6 (C), 133.0 (C), 135.8 (C) 160.4 (C=O) and 168.4 (C=O). |

America. SD810, or SynDril 810, is a drilling fluid available for sale under the same or different names at various refineries in North America.

The downhole fluids disclosed herein may be used as downhole treatment fluids, as drilling fluids, or for other downhole uses. FIG. 60 illustrates the fluid 30 being used as a drilling fluid in association with a drill bit 32 drilling a well 34. For a drilling fluid example, a sample of Syndril 810 (SD810), which is a mineral oil, was mixed with 5 mM TO. The mixture was mixed for 5 hours in a mixer at level 1-40% and left mixing overnight. The sample wasn't fully dissolved by the morning so the sample was heated for 30 min at 70° C. before being mixed again for 1 hour after which the TO had fully dissolved into the sample mixture. Viscosity was tested on a Fann Model 35A 6 speed Viscometer available from the FANN INSTRUMENT COMPANY, of Houston, Tex. Viscosity results are shown below in Table 12, and indicated a plastic viscosity of 10 cP and a yield point of 12 lbs/100 ft$^2$. The drilling fluid testing indicated that the resulting mixture has suitable viscosity and low end rheology (solids removal). The viscosity test was then repeated after a wetting agent (described further above) was added (5 mL/L) to the sample. The viscosity results for the subsequent test with the wetting agent sample are shown below in Table 13, and indicate a plastic viscosity of 10 cP and a yield point of 11.5 lbs/100 ft$^2$. Drilling chemicals are generally large amines that don't affect the hydrogen bonding of the pyromellitamide gel.

TABLE 12

Drilling fluid test results

| Speed (RPM) | Viscosity (cP) |
|---|---|
| 600/300 | 44/34 |
| 200/100 | 30/26 |
| 6/3 | 21/19 |

TABLE 13

Drilling Fluid test results with Wetting Agent

| Speed (RPM) | Viscosity (cP) |
|---|---|
| 600/300 | 43/33 |
| 200/100 | 29/24 |
| 6/3 | 20/18 |

Table 14 illustrates further tests done with drilling fluid (5 mM TO in SD810, with rev dust and a wetting agent Dynol™ 604), and indicate a plastic viscosity of 17 cP and a yield point of 10.5 lbs/100 ft$^2$.

TABLE 14

Drilling fluid results with wetting agent

| Speed (RPM) | Viscosity (cP) |
|---|---|
| 3 | 18 |
| 6 | 19 |
| 100 | 26 |
| 200 | 32 |
| 300 | 38 |
| 600 | 55 |

Table 15 illustrates viscosity testing that compares a 5 mM TO gel in SD810 with various other drilling fluids. Table 16 indicates the components present in the drilling muds tested. Viscosity and ES measurement taken at 25° C., and fluid loss was performed at 100° C. and 500 psi differential pressure. As can be see, the SD810 drilling fluid showed higher viscosity than comparable drilling muds.

TABLE 15

Further drilling fluid evaluation of DF-48

| | | SynDril 810 | Drillsol Plus 90/10 BHR | Drillsol Plus 90/10 AHR | Synoil 470 90/10 BHR | Synoil 470 90/10 AHR |
|---|---|---|---|---|---|---|
| Viscosity | 600 rpm | 65 | 46 | 40 | 29 | 25 |
| | 300 rpm | 45 | 28 | 24 | 17 | 15 |
| | 200 rpm | 37 | 21 | 18 | 12 | 11 |
| | 100 rpm | 30 | 14 | 12 | 7 | 7 |
| | 6 rpm | 22 | 5 | 4 | 2 | 2 |
| | 3 rpm | 22 | 4 | 3 | 1 | 1 |
| Plastic viscosity (mPa-s) | | 20 | 18 | 16 | 12 | 10 |
| Yield point (Pa) | | 12.5 | 5 | 4 | 2.5 | 2.5 |
| ES—Electrical Stability (ave) | | <1999 | 1562 | >2000 | 644 | 1777 |
| HTHP—high temperature high pressure (mL) | | 4.6 | | 5.3 | | 6.1 |

TABLE 16

Components of drilling fluids from Table 15

| | SynDril 810 | Drillsol Plus 90/10 BHR | Drillsol Plus 90/10 AHR | Synoil 470 90/10 BHR | Synoil 470 90/10 AHR |
|---|---|---|---|---|---|
| Base fluid | | | | | |
| DF-48 (TO) | 3.30 kg/m$^3$ | | | | |
| Wetting agent (Drilltreat from Halliburton) | 4 L/m$^3$ | | | | |
| Rev Dust | 50 Kg/m$^3$ | 100 Kg/m$^3$ | | 100 Kg/m$^3$ | |
| Drillsol Plus | | 90/10 OWR | | | |
| Syndril 470 | | | | 90/10 OWR | |
| Bentone 150 | | 20 Kg/m$^3$ | | 20 Kg/m$^3$ | |
| 30% CaCl$_2$ brine | | 90/10 OWR | | 90/10 OWR | |
| Clearwater P | | 10 L/m$^3$ | | 10 L/m$^3$ | |
| Clearwater S | | 5 L/m$^3$ | | 5 L/m$^3$ | |
| Lime | | 12 Kg/m$^3$ | | 12 Kg/m$^3$ | |

The base fluid may comprises fluid other than hydrocarbons. For example, the base fluid may include one or more of nitrogen or carbon dioxide. For further example N2 may be present at 50-95% while CO2 may be present at 5-50%. Other ranges and other base fluids may be used. Hydrocarbon base fluids may be combined with other fluids such as N2 and CO2 in some cases.

In the case of a hydrocarbon base fluid, TH or TO gellant or other pyromellitamide gellant may be first mixed with an inert solvent before mixing with the base fluid. The inert solvent has the property that it does not react with the gel as a result of addition of the TH or TO gellant. The inert solvent may be selected to have a swelling effect on the TH or TO or other pyromellitamide gellant. The pyromellitamide gellant forms stacked plates, and when the inert solvent is a weak proton donor or acceptor it has the effect of spreading the stacked plates apart. When the stacked plates are spread apart, hydrocarbons in the base fluid may more easily form hydrogen bonds with the pyromellitamide gel and gel the hydrocarbon base fluid. The inert solvent thus functions as an agent to enhance or quicken gelling of the pyromellitamide gelling agent in the hydrocarbon base fluid.

The inert solvent may comprise on or more of water, ethylene glycol, dowanol DPM™, methyl acetate, ethyl acetate, propyl acetate, butyl acetate, octyl acetate, octanol, decanol, acetonitrile, propylnitrile, butylnitrile, ethylacetoacetate, acetone, acetylacetone, acetic anhydride, dimethylformamide, 1-4-dioxane, nitromethane, 2-pentanone, 2-pentandione, methyl, ethyl ketone, diethyl malonate. These inert solvents may be used separately or in conjunction with each other. The composition of the solvent and pyromellitamide gelling agent may be 60-85% (by volume) inert solvent and 15-40% (by volume) pyromellitamide gelling agent such as TO or TH (between a ratio of 60:40 and 85:15). The chemical inertness of the inert solvent towards the TH or TO molecule allows the base fluid to carry the molecule so the molecule can be delivered to its ultimate end use. The base fluid also provides a slight amount of activation of the TO or TH molecule so that it accelerates its gelation/viscosity function when delivery occurs. Glycol may also help with the activation of the molecule.

TH is suitable for use with hydrocarbon base fluids used in fracturing operations. TO is suitable for use with hydrocarbon base fluids used in drilling applications. Breakers, wetting agents, suspending agents and other additives may be used with the base fluid, such as a fracturing fluid or drilling fluid, as for example disclosed herein.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

What is claimed is:

1. A method of treating a well comprising applying a fluid to the well, wherein the fluid comprises:

a hydrocarbon base fluid, a gelling agent, and an inert solvent to enhance gelling of the gelling agent in the hydrocarbon base fluid for downhole uses, in which the gelling agent is a pyromellitamide gelling agent that comprises an aromatic ring having four amide branches, each of the four amide branches having a carbon to carbon bond with the aromatic ring and each amide branch of the four amide branches has a side chain that is a hydrogen;

in which the gelling agent has the general formula of:

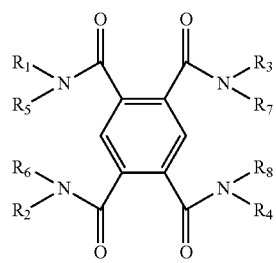

in which each of R5, R6, R7 and R8 are hydrogens, and each of R1, R2, R3, and R4 is an alkyl group;

in which R1, R2, and R3 are each hexyl groups and R4 is a hexyl group or benzyl group or R1, R2, R3, and R4 are each octyl groups; and in which the gelling agent is present in the fluid in a concentration from 1-10 mM and the fluid is at a temperature from 20-80° C.;

in a fracturing operation or a drilling operation.

2. The method of claim 1 in which the inert solvent comprises one or more of water, ethylene glycol, dowanol DPM™, methyl acetate, ethyl acetate, propyl acetate, butyl acetate, octyl acetate, octanol, decanol, acetonitrile, propylnitrile, butylnitrile, ethylacetoacetate, acetone, acetylacetone, acetic anhydride, dimethylformamide, 1-4-dioxane, nitromethane, 2 pentanone, 2-pentandione, methyl, ethyl ketone and diethyl malonate.

3. The method of claim 2 in which the inert solvent is present in a volume ratio between 60:40 and 85:15 in relation to the pyromellitamide gelling agent.

4. The method of claim 3 in which the pyromellitamide gelling agent comprises N,N',N'',N'''-tetrahexylbenzene-1,2,4,5-tetracarboxamide.

5. The method of claim 3 in which the pyromellitamide gelling agent comprises N,N',N'',N'''-tetraoctylbenzene-1,2,4,5-tetracarboxamide.

6. The method of claim 3 in which the fluid further comprises one or more of a breaker, a suspending agent, and a wetting agent.

7. The method of claim 1 in which the fluid further comprises a glycol.

8. The method of claim 1 carried out as a fracturing operation and in which R4 comprises a hexyl group.

9. The method of claim 1 carried out as a fracturing operation and in which R4 comprises a benzyl group.

10. The method of claim 1 carried out in a fracturing operation in the case of R1, R2 and R3 being each hexyl groups and R4 being hexyl group or benzyl group.

11. The method of claim 1 carried out in a drilling operation in the case of R1, R2, R3, and R4 being each octyl groups.

* * * * *